United States Patent
Peluso et al.

(10) Patent No.: US 10,459,418 B2
(45) Date of Patent: Oct. 29, 2019

(54) TECHNOLOGY FOR ASSESSING AND PRESENTING FIELD DEVICE COMMISSIONING INFORMATION ASSOCIATED WITH A PROCESS PLANT

(71) Applicant: FISHER-ROSEMOUNT SYSTEMS, INC., Round Rock, TX (US)

(72) Inventors: Marcos A. V. Peluso, Chanhassen, MN (US); Scott N. Hokeness, Lakeville, MN (US); Qian Xiao, Eden Prairie, MN (US); Charles H. Pille, Burnsville, MN (US); Paul Hurt, Lino Lakes, MN (US); Nghy Hong, Savage, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 29 days.

(21) Appl. No.: 15/722,383

(22) Filed: Oct. 2, 2017

(65) Prior Publication Data

US 2018/0024519 A1    Jan. 25, 2018

Related U.S. Application Data

(63) Continuation-in-part of application No. 14/477,266, filed on Sep. 4, 2014, now Pat. No. 9,851,707.

(Continued)

(51) Int. Cl.
G05B 19/414    (2006.01)
G05B 19/418    (2006.01)
(Continued)

(52) U.S. Cl.
CPC ....... *G05B 19/048* (2013.01); *G05B 19/0426* (2013.01); *G05B 19/4065* (2013.01);
(Continued)

(58) Field of Classification Search
CPC ............ G05B 19/4183; G05B 19/4187; G05B 19/418; G05B 19/048; G05B 19/0426;
(Continued)

(56) References Cited

U.S. PATENT DOCUMENTS 5,796,602 A    8/1998    Wellan et al.
6,098,116 A *  8/2000    Nixon ................ G05B 19/0426
                                                    709/220

(Continued)

FOREIGN PATENT DOCUMENTS

JP    2002-258936 A    9/2002
JP    2003-186529 A    7/2003
(Continued)

OTHER PUBLICATIONS

Derision on Rejection for Japanese Patent Application No. 2016-540377, dated Oct. 31, 2017, 9 pages including English translation.

(Continued)

*Primary Examiner* — Jason D Mitchell
(74) *Attorney, Agent, or Firm* — Marshall, Gerstein & Borun LLP

(57) ABSTRACT

Techniques for assessing and presenting differences between the current commissioning data of a set of process control devices within a process plant and the respective baseline or defined commissioning parameters of the set of process control devices. According to embodiments, systems and methods may obtain the current commissioning data from the set of process control devices and access baseline parameters corresponding to the commissioning data. The systems and methods may compare the current commissioning data to the baseline parameters to determine a set of differences, and present, via a user interface, the set of differences for review by an administrator. In reviewing the set of differences, the administrator may facilitate different (Continued)

functionalities including rebaselining or reconfiguring process control devices.

28 Claims, 15 Drawing Sheets

Related U.S. Application Data

(60) Provisional application No. 61/873,390, filed on Sep. 4, 2013.

(51) Int. Cl.
    *G05B 19/048*     (2006.01)
    *G05B 19/4065*     (2006.01)
    *G05B 19/4067*     (2006.01)
    *G05B 19/042*     (2006.01)
    *G05B 19/4068*     (2006.01)

(52) U.S. Cl.
CPC ....... *G05B 19/4067* (2013.01); *G05B 19/418* (2013.01); *G05B 19/4147* (2013.01); *G05B 19/4068* (2013.01); *G05B 19/4187* (2013.01); *G05B 2219/23192* (2013.01); *G05B 2219/25061* (2013.01); *G05B 2219/25428* (2013.01)

(58) Field of Classification Search
CPC .............. G05B 19/406; G05B 19/4065; G05B 19/4067; G05B 19/4147; G05B 19/4068; G05B 2219/23192; G05B 19/25061; G05B 19/25428
USPC ........................................................ 700/28
See application file for complete search history.

(56) References Cited

U.S. PATENT DOCUMENTS

| | | | |
|---|---|---|---|
| 6,505,143 B1* | 1/2003 | Lakshminarasimha | G05B 19/4065 702/183 |
| 6,618,630 B1* | 9/2003 | Jundt | G05B 15/02 700/17 |
| 6,957,206 B2 | 10/2005 | Nolan | |
| 7,496,634 B1* | 2/2009 | Cooley | G06Q 10/107 709/205 |
| 7,761,591 B2 | 7/2010 | Graham | |
| 7,933,594 B2* | 4/2011 | Nixon | H04W 40/24 455/428 |
| 8,527,888 B2* | 9/2013 | Bump | G05B 19/41845 700/1 |
| 9,052,708 B2* | 6/2015 | Vishwanath | G05B 19/41845 |
| 9,563,188 B2* | 2/2017 | Banerjee | G05B 15/02 |
| 9,767,197 B1* | 9/2017 | Agarwal | G06F 17/30864 |
| 2002/0169977 A1* | 11/2002 | Chmaytelli | H04L 63/0861 726/7 |
| 2003/0014536 A1* | 1/2003 | Christensen | G05B 19/042 709/238 |
| 2003/0051056 A1* | 3/2003 | Pascual | H03M 7/28 709/247 |
| 2004/0162829 A1* | 8/2004 | Gabos | G06F 17/3056 |
| 2004/0259533 A1* | 12/2004 | Nixon | H04W 76/14 455/414.1 |
| 2005/0123884 A1 | 6/2005 | Walls et al. | |
| 2005/0217797 A1* | 10/2005 | Jafarian-Tehrani | H01J 37/32082 156/345.28 |
| 2006/0092039 A1 | 5/2006 | Saito et al. | |
| 2007/0078540 A1 | 4/2007 | Bump et al. | |
| 2007/0150574 A1* | 6/2007 | Mallal | H04L 63/1408 709/223 |
| 2008/0034015 A1 | 2/2008 | Behnen et al. | |
| 2009/0070051 A1 | 3/2009 | Vetter et al. | |
| 2009/0125825 A1* | 5/2009 | Rye | G05B 23/0216 715/764 |
| 2009/0210386 A1* | 8/2009 | Cahill | G06F 9/451 |
| 2010/0149997 A1* | 6/2010 | Law | G05B 19/4185 370/248 |
| 2010/0290351 A1* | 11/2010 | Toepke | G05B 19/4185 370/250 |
| 2011/0191500 A1 | 8/2011 | Odayappan et al. | |
| 2011/0234469 A1* | 9/2011 | Shoji | H01Q 21/28 343/852 |
| 2011/0265151 A1* | 10/2011 | Furlan | H04L 12/2809 726/4 |
| 2011/0313547 A1* | 12/2011 | Hernandez | G05B 19/042 700/23 |
| 2012/0078869 A1* | 3/2012 | Bellville | G06F 17/30943 707/706 |
| 2012/0093242 A1* | 4/2012 | Wallace | G05B 19/042 375/259 |
| 2013/0031260 A1* | 1/2013 | Jones | H04L 63/0853 709/228 |
| 2013/0211547 A1 | 8/2013 | Buchdunger et al. | |
| 2013/0282931 A1* | 10/2013 | Petzen | H04L 61/2038 710/9 |
| 2014/0025186 A1* | 1/2014 | Ojha | G05B 19/0426 700/83 |
| 2014/0067091 A1* | 3/2014 | Vishwanath | G05B 19/41845 700/83 |
| 2014/0212978 A1 | 7/2014 | Sharpe, Jr. et al. | |
| 2015/0032273 A1* | 1/2015 | Romney | A01G 25/16 700/284 |
| 2015/0039130 A1* | 2/2015 | Banerjee | G05B 15/02 700/275 |
| 2015/0066162 A1* | 3/2015 | Hokeness | G05B 19/0426 700/28 |
| 2015/0127876 A1* | 5/2015 | Erni | G05B 19/4185 710/315 |
| 2015/0135117 A1* | 5/2015 | Rajappa | G05B 19/4183 715/771 |
| 2015/0233790 A1* | 8/2015 | Ratilla | G05B 19/0426 702/188 |
| 2016/0216706 A1* | 7/2016 | Christensen | G05B 19/41865 |
| 2016/0259315 A1 | 9/2016 | Alexander et al. | |
| 2017/0227944 A1 | 8/2017 | Goli et al. | |

FOREIGN PATENT DOCUMENTS

| | | |
|---|---|---|
| JP | 2005-531826 A | 10/2005 |
| JP | 2006-302229 A | 11/2006 |
| JP | 2008-192152 A | 8/2008 |
| JP | 2009-505232 A | 2/2009 |
| JP | 2009-518749 A | 5/2009 |
| JP | 2011-059873 A | 3/2011 |
| JP | 2011-203954 A | 10/2011 |
| JP | 2012032899 A | 2/2012 |
| WO | WO-2017/066304 A1 | 4/2017 |

OTHER PUBLICATIONS

Second Office Action for Chinese Patent Application No. 201480003931.5, dated Jul. 6, 2017, 27 pages including English translation.
Fan, Jiyuan, and Stuart Borlase. "The evolution of distribution." IEEE Power and Energy magazine 7.2 (2009): pp. 63-68.
Chen, Deji, Mark Nixon, and Aloysius Mok. "Why WirelessHART." WirelessHARTTM. Springer US, 2010. pp. 195-199.
Wollschlaeger, Martin, et al. "Integration of fieldbus systems into on-line asset management solutions based on fieldbus profile descriptions." Factory Communication Systems, 2002. 4th IEEE International Workshop on. IEEE, 2002. pp. 89-96.
475 Field Communicator Product Data Sheet, Emerson Process Management, May 2013, available at: <www.fieldcommunicator.com> 8 pages.
AMS Suite—Improve Reliability and Performance, Emerson Process Management, 2013, available at: <www.assetweb.com>, 16 pages.

(56) References Cited

OTHER PUBLICATIONS

First Office Action for Chinese Patent Application No. 201480003931.5 dated Nov. 9, 2016, 27 pages.
International Search Report and Written Opinion for International Application No. PCT/US2014/054055, dated Dec. 17, 2014, Date of Filing: Sep. 4, 2014, 15 pages.
EPO Communication for European Patent Application No. 14841731.4, dated Mar. 16, 2017, 12 pages.
Office Action for Japanese Patent Application No. 2016-540377, dated Mar. 7, 2017, 7 pages with English translation.
Search Report for Application No. GB1815499.7, dated Mar. 11, 2019.

* cited by examiner

440

[Device View]
← → C ⚠ Not secure |//pamtech7/AmsDeviceView/devices/654

← Details

03/10/2017 10:34:10.780
ABB MAG 50XM2000, Rev. 0
Flow

441

Commissioning Status  1 of 138 Devices in the Expansion to Double Separation Process Project Tag and Location assigned on 16 May by cbutikof Device connected to system and imported from DeltaV on 16May17

Device Zeroed on 17May17 by cbutikof and Calibration Synced on 16May17
Device Checks marked complete on 17May17 by cbutikof This device has not been part of a loop test since it became live.

Project Device Monitoring

Health                                                              Bad

Alerts
• fill'er up 1625
  Apr 19, 2017                                                        >

More                                                                  >

FIG. 4I

TECHNOLOGY FOR ASSESSING AND PRESENTING FIELD DEVICE COMMISSIONING INFORMATION ASSOCIATED WITH A PROCESS PLANT

CROSS REFERENCE TO RELATED APPLICATIONS

This application is a continuation-in-part application which claims the benefit of and priority to U.S. application Ser. No. 14/477,266, entitled "BULK FIELD DEVICE OPERATIONS" and filed on Sep. 4, 2014, which claims the benefit of U.S. Provisional Application No. 61/873,390, entitled "FIELD DEVICE INTERACTIONS" and filed on Sep. 4, 2013, the entire contents of which are hereby incorporated by reference herein.

TECHNICAL FIELD

The present disclosure relates generally to process plants and process control systems, and more particularly, to determining and assessing the commissioning status of a set of process control devices within a process plant.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa. As utilized herein, field devices and controllers are generally referred to as "process control devices."

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally, the commissioning of a process plant or system involves bringing various components of the plant or system to the point where the system or plant can operate as intended. Commissioning is an involved and complex process. For example, commissioning may include actions or activities such as, inter alia, confirming an identity of an installed process control device (such as a field device) and its connections; determining and providing tags that uniquely identify the process control device within the process control system or plant; setting or configuring initial values of parameters, limits, etc.; verifying the correctness of the device's installation by manipulating signals provided to the devices; and generating as-built I/O lists to indicate the actual physical connections of the device implemented within the plant; to name a few. For some commissioning tasks, a user may utilize a commissioning tool (e.g., a handheld or portable computing device) locally at a target process control device or loop. Some commissioning tasks may be performed at an operator interface of the process control system, e.g., at an operator interface of an operator workstation included in a back-end environment of the process plant.

Typically, the commissioning of a process plant requires physical devices, connections, wiring, etc. to be installed, set up, and inter-connected in the field environment of the process plant. At the back-end environment of the plant (e.g., at the centralized administrative computing devices such as operator workstations, personal computers or computing devices, centralized databases, configuration tools, etc. that are typically placed in control rooms or other locations away from the harsher field environment of the plant), data that specifically identifies and/or addresses the various devices, their configurations, and their interconnections is integrated, verified or commissioned, and stored. As such, after the physical hardware has been installed and configured, identification information, logical instructions, and other instructions and/or data is downloaded or otherwise provided to the various devices disposed in the field environment so that the various devices are able to communicate with other devices.

Typically, components of a process plant are commissioned according to a set of desired parameters or specifications, which may be specified by one or more documents and/or tools developed by commissioning personnel. The components are commissioned using system interfaces and utilities that are also used for other management functions within the process plant, including system configuration, maintenance, and managing activities during process plant operation. However, commissioning personnel are often limited to use of the system interfaces and utilities, which results in works delays, conflicts, and errors, and often results in commissioning personnel implementing their own tools and utilities that are limited and have no interaction with the control system and field devices. These processes are time consuming, are prone to inconsistencies and mistakes, and do not enable an efficient and effective determination of whether field devices are properly commissioned.

Therefore, there is an opportunity for systems and methods to retrieve up-to-date commissioning statuses for field devices, and efficiently and effectively present discrepancies between the commissioning statuses and the intended commissioning parameters for the field devices.

SUMMARY

Techniques, systems, apparatuses, components, devices, and methods for commissioning are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

Commissioning of process control systems and/or plants includes various techniques, systems, apparatuses, components, and/or methods that allow for at least some portions of the commissioning process to be performed locally, automatically, and/or distributively, so that devices and/or other portions of a process plant may be partially or even entirely commissioned prior to being incorporated or integrated into the plant or system as a whole and before the devices are powered on. Commissioning allows, for example, various portions of process control systems to be built and at least partially commissioned at different geographical locations (e.g., at different "mod yards") prior to being brought together and integrated at the resident location or site of the process plant. As a result, commissioning allows for parallel commissioning activities and actions to take place.

A process plant may be commissioned according to a set of baseline or defined parameters, where the set of baseline or defined parameters specify how each field device within the process plant should be commissioned. However, in operation, the field devices may not be commissioned according their respective parameters, which may result in error conditions and alarms, and/or may necessitate additional repair and maintenance.

One embodiment of the techniques of the present disclosure is a computer-implemented method of accessing commissioning data associated with a set of devices in a process plant, where at least some of the set of devices may be communicatively connected to operate in the process plant during run-time to control a set of processes. The method may include obtaining, at a computing device for each of the set of devices, commissioning status data for the respective device, and accessing a set of defined commissioning parameters respectively associated with the set of devices. The method may further include determining, by the computing device for each of the set of devices, a difference between the respective commissioning status data and the respective defined commissioning parameter, and causing a user interface to indicate the set of differences between the set of commissioning status data and the set of defined commissioning parameters.

Another embodiment of these techniques is a system in a process plant for accessing commissioning data associated with the process plant. The system may include a set of devices communicatively connected to operate in the process plant during run-time to control a set of processes, a user interface for presenting content, a memory storing a set of defined commissioning parameters respectively associated with the set of devices, a communication unit, and a processor interfacing with the set of devices, the user interface, the memory, and the communication unit. The processor may be configured to receive, via the communication unit from each of the set of devices, commissioning status data for the respective device, access, from the memory, the set of defined commissioning parameters respectively associated with the set of devices, determine, for each of the set of devices, a difference between the respective commissioning status data and the respective defined commissioning parameter, and cause a user interface to indicate the set of differences between the set of commissioning status data and the set of defined commissioning parameters.

A further embodiment of these techniques is an electronic device for managing commissioning data associated with a process plant. The electronic device may include a user interface for presenting content, a transceiver interfacing with a set of devices communicatively connected to operate in the process plant during run-time to control a set of processes, a memory storing a set of computer-executable instructions, and a processor interfacing with the user interface, the transceiver, and the memory. The processor may be configured to execute the set of computer-executable instructions to cause the processor to receive, via the user interface, a selection of at least one of the set of devices, retrieve, via the transceiver from the one of the set of devices, commissioning status data for the at least one of the set of devices, the commissioning status data indicating a current configuration of the at least one of the set of devices, access a defined commissioning parameter associated with the at least one of the set of devices, determine a difference between the commissioning status data and the defined commissioning parameter, and cause the user interface to indicate the difference between the commissioning status data and the defined commissioning parameter.

An additional embodiment of these techniques is a computer-implemented method in an electronic device of presenting commissioning data associated with a set of devices in a process plant, where at least some of the set of devices may be communicatively connected to operate in the process plant during run-time to control a set of processes. The method may include receiving, from a controller for each of the set of devices, commissioning status data for the respective device, accessing a set of defined commissioning parameters respectively associated with the set of devices, determining, by a processor for each of the set of devices, a difference between the respective commissioning status data and the respective defined commissioning parameter, presenting, in a user interface, a set of sections indicating at least some of the set of differences between the set of commissioning status data and the set of defined commissioning parameters, receiving, via the user interface, a selection of a section of the set of sections, and presenting, in the user interface, information associated with a portion of the set of differences and corresponding to the section of the set of sections.

BRIEF DESCRIPTION OF THE DRAWINGS

FIGS. 4A-4J illustrate example interfaces associated with presenting commissioning data and comparisons to baseline parameters;

DETAILED DESCRIPTION

Figure 1:
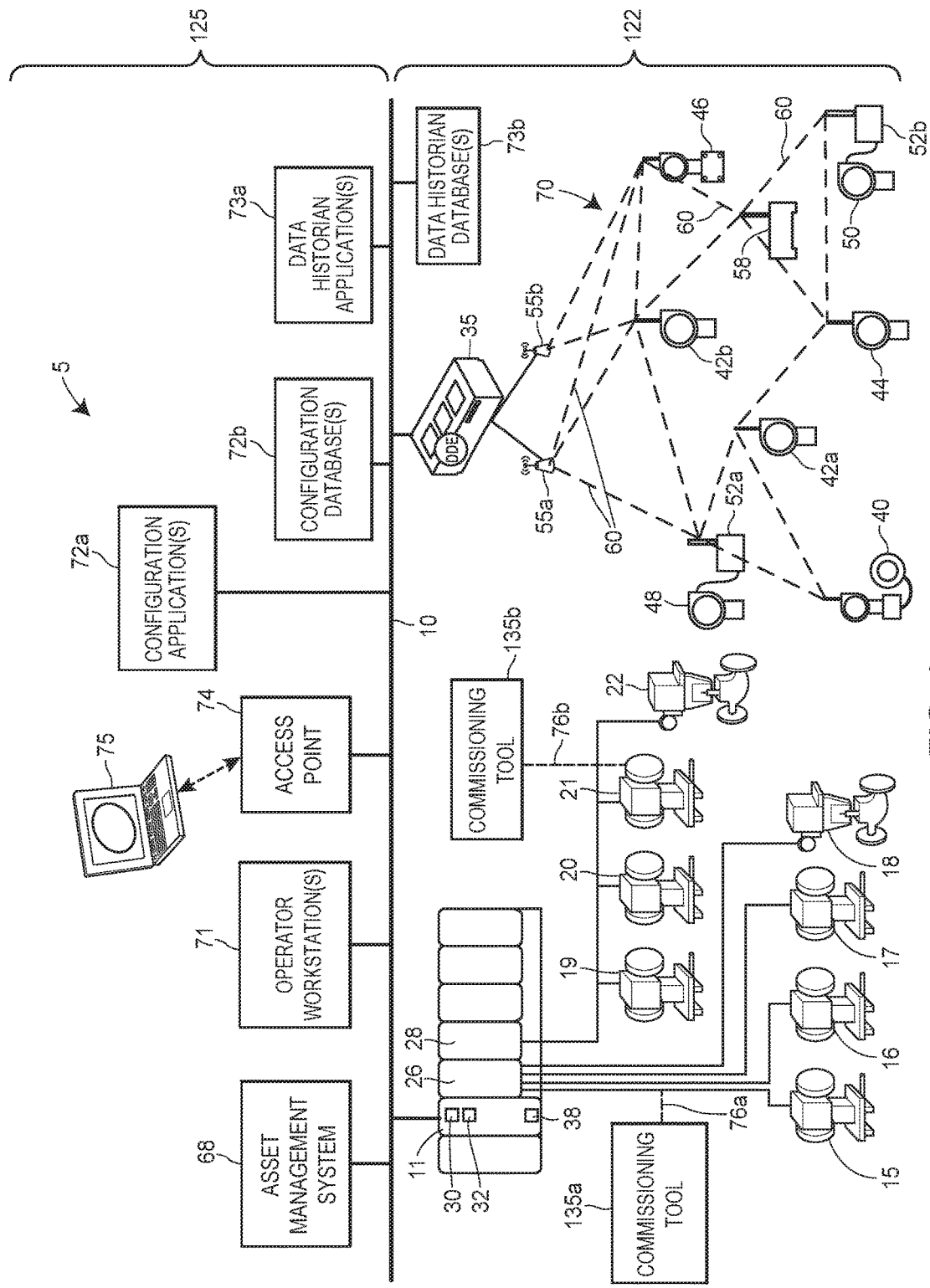
FIG. 1 depicts a block diagram illustrating an example process plant and components thereof, at least a portion of which may be commissioned by utilizing commissioning techniques described herein.

Process plants are commissioned to ensure that the systems and components of the plants are designed, tested, installed, operated, and maintained according to the operational requirements of the owners or clients, thus guaranteeing the operability, performance, reliability, safety, and information traceability of the process plants.

Commissioning a process plant may include the configuration of field devices according to a set of parameters, which may be default parameters or modifiable by an administrator of the process plant. In certain aspects, field devices may be configured in bulk using a configuration template or similar technique, such as those disclosed in aforementioned U.S. patent application Ser. No. 14/477,266. Before, concurrent with, or after the field devices are configured, the process control system may facilitate additional commissioning operations, including confirming an identity of an installed process control device (such as a field device) and its connections; determining and providing tags that uniquely identify the process control device within the process control system or plant; verifying the correctness of the device's installation by manipulating signals provided to the devices; and generating as-built I/O lists to indicate the actual physical connections of the device implemented within the plant.

Generally, a template, requirements document, or the like may include a set of defined commissioning parameters that specify how field devices of a process plant are to be commissioned. Additionally, the actual commissioning state, status, or condition of the field devices may be embodied in commissioning status data for the field devices. The systems and methods described herein obtain the commissioning status data associated with the field devices, and compare the commissioning status data to the set of defined commissioning parameters to determine (i) which, if any, of the field devices are not commissioned according to the defined parameters, and (ii) how the determined field devices deviate from the defined parameters.

The systems and methods may further generate a set of interfaces that may indicate the determined field devices and how they deviate from the defined parameters. A user or administrator associated with the process plant may access the set of interfaces to review the information, make selections, and initiate certain functionality. In particular, the user or administrator may select to modify the defined parameter(s), may select to re-configure or re-commission a field device to match the respective defined parameter(s), and/or may initiate other functionality. Generally, a "process control device," "control device," or "field device" may be any device within the plant environment, including control devices, safety devices, monitoring devices, and/or the like, that may be configured to initiate, implement, and/or manage functionalities associated therewith.

The systems and methods therefore offer numerous benefits. In particular, the systems and methods effectively and efficiently integrate with a process control system to identify field devices that are not properly commissioned, and cause the display of a set of interfaces that detail commissioning discrepancies. Accordingly, an administrator of a process plant may efficiently and effectively gauge which field devices deviate from defined parameters. The systems and methods may further enable the administrator to initiate corrective action and/or other functionalities related to the commissioning of the field devices. It should be appreciated that additional benefits are envisioned.

FIG. 1 is a block diagram of an example, commissioned process plant, process control system, or process control environment 5, at least a portion of which may been commissioned according to various techniques. The process plant 5 includes one or more process controllers that may receive signals indicative of process measurements made by field devices, process this information to implement a control routine, and generate control signals that are sent over wired or wireless process control communication links or networks to other field devices to control the operation of a process in the plant 5. Typically, at least one field device performs a physical function (e.g., opening or closing a valve, increasing or decreasing a temperature, etc.) to control the operation of a process, and some types of field devices communicate with controllers by using I/O devices. Process controllers, field devices, and I/O devices may be wired or wireless, and any number and combination of wired and wireless process controllers, field devices and I/O devices may be included in the process plant environment or system 5.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 10 (which may include one or more wired and/or wireless communication links, and may be implemented using any desired or suitable or communication protocol such as, for example, an Ethernet protocol). In an embodiment, the controller 11 is communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV™ controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other process control devices communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM) Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops, and may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26 (also referred to herein as "non-smart" or "dumb" devices), while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

In FIG. 1, the process control system 5 includes one or operator workstations 71 that are communicatively connected to the data highway. Via the operator workstations 71, operators may view and monitor real-time operations of the process plant 5, as well as take any diagnostic, corrective, maintenance, and/or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices.

The process control system 5 includes an asset management system 68 configured to facilitate certain of the functionalities discussed herein. The asset management system 68 may interface and communicate with a portion or all of the field devices 15-22 and 40-46, such as via the process controller 11 and/or the wireless gateway 35. According to embodiments, the asset management system 68 may request and retrieve, from the field devices 15-22 and 40-46, commissioning data associated with the field devices 15-22 and 40-46.

The asset management system 68 may generally include one or more software applications executing on one or more workstations (such as the operator workstation(s) 71) to enable a user to review commissioning data associated with the field devices 15-22 and 40-46 of the process control system 5. Such interaction may include diagnostics, maintenance, configuration, assessment, and/or the like. While the workstation(s) may have one or more asset management system applications running locally, a user may interface with the asset management system 68 remotely via a data communication network. Thus, a user located at the workstation(s) may interact with the asset management system 68 in order to facilitate various functions related to the process control system 5 regardless of the physical location of the user.

The example process control system 5 is further illustrated as including a configuration application 72a and configuration database 72b, each of which is also communicatively connected to the data highway 10. Various instances of the configuration application 72a may execute on one or more computing devices (not shown) to enable users to create or change process control modules and download these modules via the data highway 10 to the controllers 11, as well as enable users to create or change operator interfaces via which an operator is able to view data and change data settings within process control routines. The configuration database 72b stores the created (e.g., configured) modules and/or operator interfaces. Additionally, the configuration database 72b stores a set of defined or baseline commissioning parameters associated with any of the field devices 15-22, 40-46. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, configuration database 72b, and user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5.

The example process control system 5 includes a data historian application 73a and data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as NFC and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, I/O devices 26, 28, or wireless devices 35, 40-58) also communicate using the wireless protocol supported by the access points 74.

The example process control system 5 may also include one or more commissioning tools 135a, 135b that are used in field environment 122 for commissioning process control devices of the process plant 5. An example of the commissioning tools 135a, 135b is the AMS Trex™ Device Communicator, sold by Emerson Process Management. In embodiments, the commissioning tools 135a, 135b may automatically synchronize data with the asset management system 68. The commissioning tool 135a, 135b may be a portable computing device, such as a laptop computer, a tablet or handheld smart device, a wearable computing device, etc. The commissioning tool 135a may be used to commission the non-smart field devices 15-18, the smart field devices 19-22, and/or other devices disposed in the field environment 122 of the process plant 5. To commission the non-smart field devices 15-18, the commissioning tool 135a may communicate over a wireless link 76a (e.g., via RFID, NFC, etc.) with the I/O card 26 or any other suitable component that is connected to the non-smart field devices 15-18. In this manner, the commissioning tool 135a may transfer commissioning data (e.g., device tags) for the non-smart field devices 15-18 to the corresponding I/O card 26 or an electronic marshaling component electrically connected to the I/O card 26 (as described in more detail below). To commission the smart field devices 19-22, the commissioning tool 135b may communicate over a wireless link 76b directly with the smart field devices 19-22. In this manner, the commissioning tool 135b may transfer commissioning data (e.g., device tags) directly to the smart field devices 19-22.

In some embodiments, the process control devices may be pre-configured, e.g., while at the factory, and as such store default commissioning data before being installed or commissioned. In other embodiments, the process control devices may arrive from the factory without any commissioning data stored therein. For example, when an I/O device is communicatively connected to a non-smart field device, the I/O device does not store commissioning data for the non-smart field device until the commissioning tool 135 transfers the commissioning data to the I/O device.

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment 122 of the process plant 5. Generally speaking, in the field environment 122 of the process plant 5, raw materials are received and processed using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

As discussed herein, the configuration database(s) 72b may be disposed in the back-end environment 125 of the process plant 5, and may be used for commissioning purposes. The configuration database(s) 72b may store, inter alia, data and other information that specifically identifies and/or addresses the various devices or components and their interconnections that are planned for or desired to be implemented on the process plant floor or field environment 122. Some of this commissioning data may be provided to components in the field environment 122 for use in commissioning of devices and loops therein, and some of this data may be utilized in the back-end environment 125, e.g., for the design, development, and preparation of control modules and/or operator interface modules that will operate in conjunction with the field environment 122 during live operations of the process plant 5.

Figure 2:
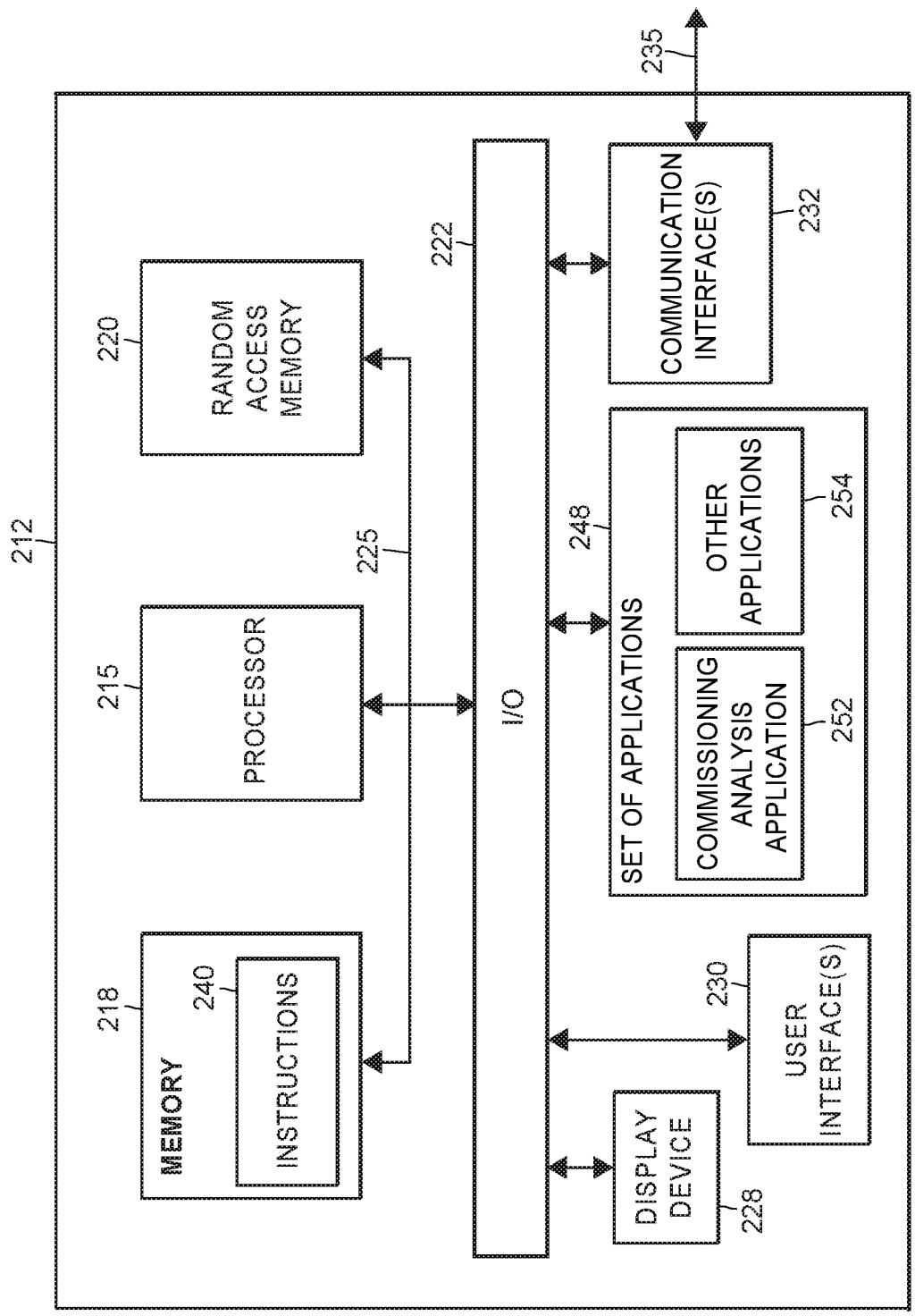
FIG. 2 illustrates a block diagram of a device configured to obtain, store, and analyze data and parameters related to the commissioning of a process plant.

FIG. 2 illustrates a simplified block diagram of an example device 212 (also referred to herein as a system or apparatus 212) that is particularly configured to obtain, store, and analyze data and parameters related to the commissioning of a process plant. In some situations, the device 212 may be utilized to commission the field device and other process elements. The device 212 may be a computer or a computing device, or the device 212 may be another system, apparatus or device that is particularly configured to support the techniques, methods, and systems of the present disclosure, including, but not limited to, cellular telephones, smart phones, tablets or other wireless devices, personal digital assistants, media players, appliances, to name a few. The device 212 may be incorporated into one or more of the components of the process plant 5 (e.g., the operator workstation(s) 71, the configuration application(s) 72a, the user interface devices 75, etc.) as described with respect to the FIG. 1. For ease of discussion and not for limitation purposes, though, the device 212 is referred to herein as a computing device 212.

The example computing device 212 includes a processor 215 for executing computer executable instructions, a program memory 218 for permanently storing data related to the computer executable instructions, a random-access memory (RAM) 220 for temporarily storing data related to the computer executable instructions, and an input/output (I/O) circuit 222, all of which may be interconnected via an address/data bus 225. In some configurations, the processor 215 is a multi-core processor or processor that has co-processing capabilities (e.g., quantum, cell, chemical, photonic, bio-chemical, biological processing technologies, and/or other suitable co-processing technologies). In some configurations, the memory 218 and/or the RAM 220 are implemented using high-density memory technology, such as solid state drive memory, flash memory, semiconductor memory, optical memory, molecular memory, biological memory, or any other suitable high density memory technology. In an example configuration, the computing device 212 includes multi-core processors and/or high-density memory technology.

It should be appreciated that although only one processor 215 is shown in FIG. 2, the computing device 212 may include multiple processors 215. Similarly, the memory of the computing device 212 may include multiple RAMs (Random Access Memories) 220 and/or multiple program memories 218. The RAM(s) 220 and/or program memories 218 may be implemented as one or more semiconductor memories, flash memories, magnetically readable memories, optically readable memories, biological memories, and/or other tangible, non-transitory computer-readable storage media, for example. Additionally, although the I/O circuit 222 is shown as a single block, it should be appreciated that the I/O circuit 222 may include a number of different types of I/O circuits. For example, a first I/O circuit may correspond to a display device 228 of the device 212, and the first or a second I/O circuit may correspond to a user interface 230 of the device 212. The user interface 230 may include, for example, a keyboard, a mouse, a touch screen, a voice activation device, and/or any other known user interface device. In some embodiments, the display device 228 and the user interface 230 may be jointly incorporated in a single physical device, e.g., a touch screen. Additionally or alternatively, the display device 228 and/or the user interface 230 may be incorporated into a device separate from the computing device 212. For example, the computing device 212 may be implemented within the operator workstation 71, and the display device 228 and/or the user interface 230 may be implemented within the user interface device 75.

The computing device 212 includes one or more network or communication interfaces 232 via which one or more respective links 235 to one or more respective communication or data networks are accessed. The communication interfaces 232 may include interfaces to one or more process control specific communication and/or data networks, e.g., Fieldbus, Profibus, HART, 4-20 mA loops, WirelessHART, process control big data, etc. For example, the computing device 212 includes an interface to a process control big data network. Additionally or alternatively, the communication interfaces 232 may include one or more interfaces to general purpose communication and/or data networks, e.g., Ethernet, NFC, RFID, Wi-Fi, etc. A link 235 to a communication or data network may be as a memory access function, and/or a link 235 may be a wired, wireless, or multi-stage connection. Many types of interfaces 232 and links 235 are known in the art of networking and may be used in conjunction with the computing device 212.

The computing device 212 includes one or more sets of particular computer executable instructions 240 stored thereon, and as such, the computing device 212 is particularly configured at least in part by the particular one or more sets of instructions 240 stored thereon. As used herein, the terms "computer-executable instructions," "computer executable instructions," and "instructions" are used interchangeably. As shown in FIG. 2, the instructions 240 are stored on the memory 218 and executable by the processor 215 to perform any portion or all of the methods and/or techniques described herein. The one or more sets of instructions 240 may comprise one or more engines, routines, applications, or programs. A set of applications 248 may be included as part of the one or more sets of instructions 240. In embodiments, the set of applications 248 may be associated with the asset management system 68 and may include a commissioning analysis application 252 configured to obtain and analyze commissioning data of field devices, compare the commissioning data to stored parameters, and determine information to present via the display device 228 and/or the user interface 230, as further discussed herein. The set of applications 248 may include a set of other applications 254.

Of course, although not illustrated in FIG. 2, the computing device 212 may additionally or alternatively include other sets of instructions 240 and/or other elements or components.

Figure 3:
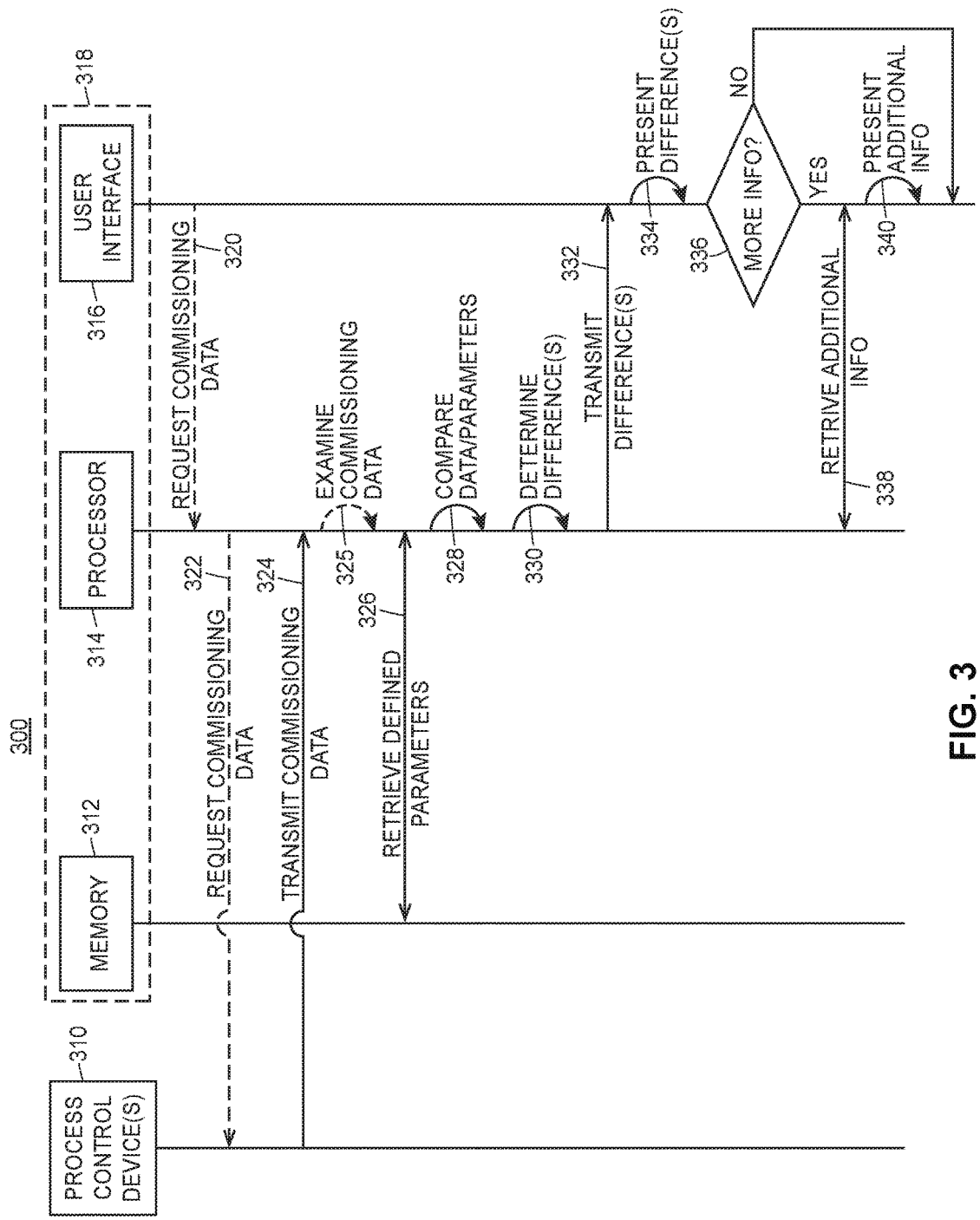
FIG. 3 illustrates a signal diagram associated with obtaining commissioning data associated with a process plant and comparing the commissioning data to baseline parameters.

FIG. 3 depicts a signal diagram 300 associated with accessing and analyzing commissioning data associated with a set of process control devices in a process plant. The signal diagram 300 includes a set of process control devices 310, a database or memory 312, a computer processor 314, and a display device or user interface 316. In an implementation, one or more of the memory 312, the processor 314, and the user interface 316 may be incorporated into a single electronic device 318, or may be separate components incorporated within distinct devices or components. The set of process control devices 310, the memory 312, the processor 314, and user interface 316 may communicate with each other via various wired or wireless interfaces as discussed herein.

The electronic device 318 may be a workstation, such as one of the operator workstation(s) 71 as discussed with respect to FIG. 1, where the workstation may support and execute a software application(s) associated with the asset management system 68 as discussed with respect to FIG. 1, where the software application(s) have associated a set of interfaces that may be displayed by the user interface 316.

The signal diagram 300 may begin when the processor 314 optionally receives (320), from the user interface 316, a request for commissioning data associated with at least one of the set of process control devices 310. In embodiments, a user of the user interface 316 may initiate the request, and may select the at least one of the set of process control devices 310 via a display that indicates the set of process control devices 310 and information relating thereto. For example, the user may request commissioning data for a set of process control devices associated with a boiler within the process plant.

The processor 314 may optionally send (322), to the specified process control device(s) 310, a request for commissioning data. The request may correspond to the request received in (320), or may be a separate request, where the request may specify at least one (or all) of the process control device(s) 310. Generally, the request may indicate one or more portions of commissioning data such as, for example, device information, device health, configuration data, connectivity status, commissioning status, and/or others. In certain embodiments, the processor 314 may send the request automatically, such as at periodic intervals (e.g., once/minute, once/hour, etc.), or in response to a trigger (e.g., a request from a user, the presence of updated commissioning data, etc.).

The process control device(s) 310 may transmit (324) commissioning data to the processor 314. The commissioning data may correspond to the request received in (322), or the process control device(s) 310 may transmit the commissioning data automatically, such as at periodic intervals (e.g., once/minute, once/hour, etc.), or in response to a trigger (e.g., upon a change to the data, the presence of updated commissioning data, etc.). The commissioning data may include for example, device information, device health, configuration data, connectivity status, commissioning status, and/or others.

The processor 314 may optionally examine (325) the commissioning data to identify the types of data included in the commissioning data. In particular, the commissioning data may include one or more portions such as, for example, device information, configuration data, connectivity status, commissioning status, and/or others. The processor 314 may retrieve (326) defined parameters for the commissioning data. In particular, the processor 314 may retrieve defined parameter(s) according to the types of data included in the commissioning data. For example, if the commissioning data includes timing settings for a valve associated with a boiler, the processor 314 may retrieve the parameters that correspond to the timing settings for the valve. According to embodiments, the defined parameters may represent a desired commissioning state for the process control device(s) 310. Generally, the memory 312 may maintain the defined parameters, where an administrator or user associated with the process control system may input, modify, update, or add to the defined parameters.

After receipt of the defined parameters, the processor 314 may determine (330) a set of differences between the commissioning data and the defined parameters. For example, the defined parameters may specify that a certain valve have an active connection between 8:00 AM and 5:00 PM, and the commissioning data may indicate that at 10:00 AM, the certain valve does not have an active connection. Thus, the difference may indicate this discrepancy in connection status. For further example, the defined parameters may specify that a flow rate sensor trigger an alarm when a corresponding flow rate exceeds 5.0 cc/min, and the commissioning data may indicate that the flow rate sensor is configured to trigger an alarm when the corresponding flow rate exceeds 10.0 cc/min. Thus, the difference may indicate this discrepancy in flow rate values.

The processor 314 may transmit (332) an indication of the difference(s) to the user interface 316. In particular, the processor 314 may generate a visual layout, interface, graphic, or the like that indicates the difference(s) determined in (330), where the visual layout may be configured for display by the user interface 316. The user interface 316 may accordingly present (334) the difference(s). Accordingly, a user may access the user interface 316 to review the difference(s) and assess whether any actions are needed to address the difference(s). According to embodiments, the user interface 316 may employ various interfaces, graphics, arrangements, and/or the like, that may include various textual, visual, and/or graphical content, in presenting the differences. Various of these visual interfaces are described with respect to FIGS. 4A-4J.

The user interface 316 may support interaction with the user, such as via a touchscreen input or input detected from a peripheral device such as a mouse or keyboard. In particular, the user interface 316 may enable searching, such as by a particular process control device, sorting, consolidating, and/or other modifications or interactions. In embodiments, the user may select to review additional information associated with the process control device(s) 310, such as information that may not be displayed in the user interface 316. Accordingly, the user interface 316 may detect (336) whether more information has been requested. If the user interface 316 does not detect that more information has been requested ("NO"), processing may end, repeat, or proceed to other functionality.

If the user interface 316 detects that more information has been requested ("YES"), the user interface 316 may retrieve (338) additional information from the processor 314. In some embodiments, the processor 314 may retrieve the additional information from the memory 312 or from the appropriate process control device(s) 310. For example, the additional information may include a set of measurements detected by a pressure sensor. After retrieving the additional information, the user interface 316 may present (340) the additional information for access and review by the user.

FIGS. 4A-4J illustrate example interfaces associated with the systems and methods. An electronic device, such as any of the electronic or computing devices as discussed herein (e.g., a workstation such as the operator workstation(s) 71), may be configured to display the interfaces in a user interface and/or receive selections and inputs via the user interface. Further, the interfaces may be associated with the software application(s) associated with the asset management system 68 as discussed with respect to FIG. 1. Generally, the interfaces may include data and content associated with the commissioning status of process control device(s) within a process plant. One or more dedicated applications that are configured to operate on the electronic device may display the interfaces, where an individual may have proper credentials to access the application(s).

The electronic device may receive the content included in the interfaces from one or more components, such as, for example, the process control device(s) 310, the memory 312, and/or the processor 314 as discussed with respect to FIG. 3. It should be appreciated that the interfaces are merely examples and that alternative or additional content is envisioned.

Figure 4A:
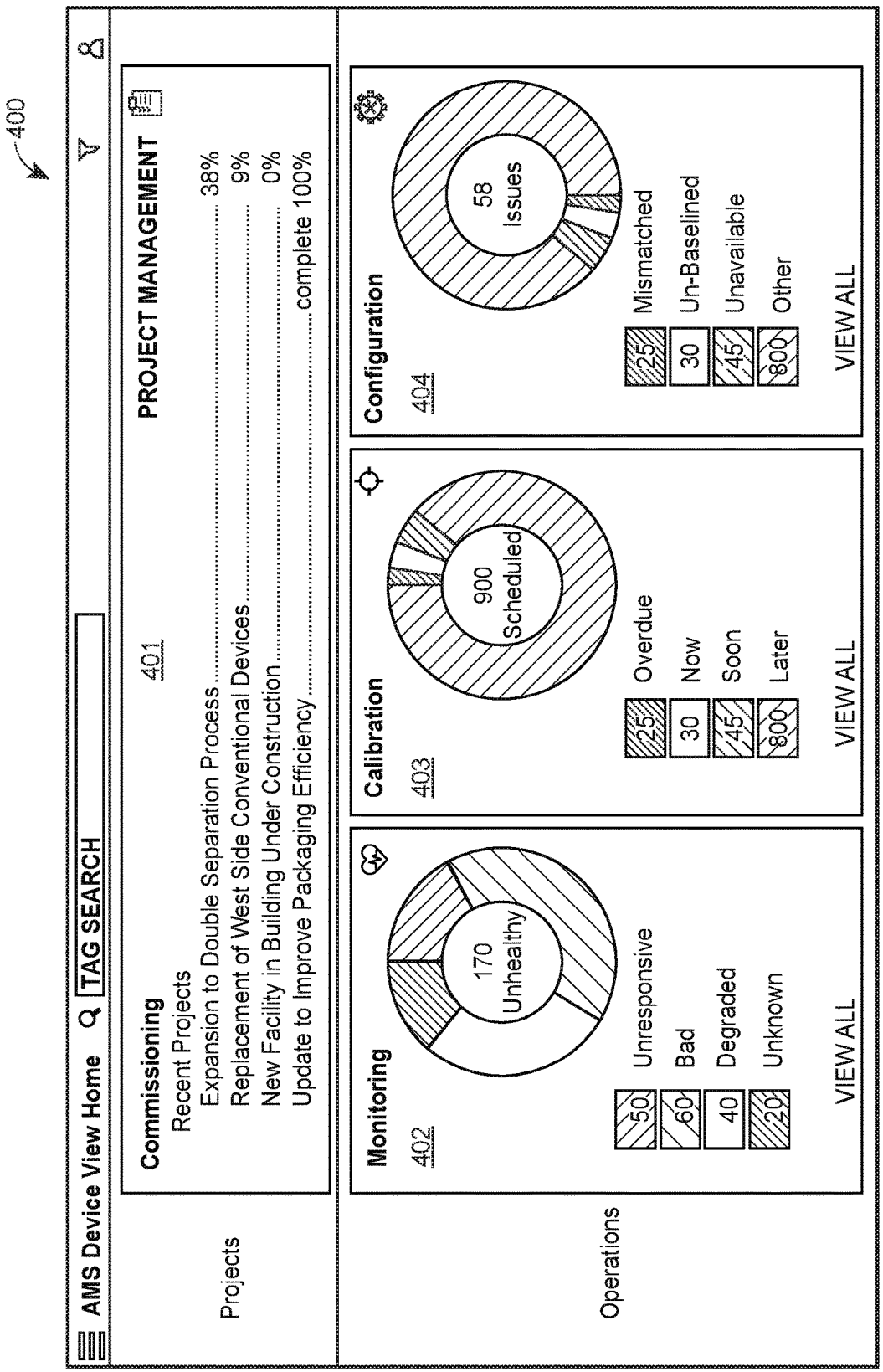

FIG. 4A illustrates an interface 400 that may represent a home or launch screen of the application. The interface 400 may include selectable portions or sections: a project section 401 that may indicate recent commissioning projects that are scheduled, completed, or in process within the process plant; a monitoring section 402 that may indicate the monitoring status of process control devices (e.g., unresponsive, bad, degraded, unknown); a calibration section 403 that may indicate the calibration scheduling status of process control devices (e.g., overdue, now, soon, later); and a configuration section 404 that may indicate the configuration status of process control devices (e.g., mismatched, un-baselined, unavailable, other).

Figure 4B:
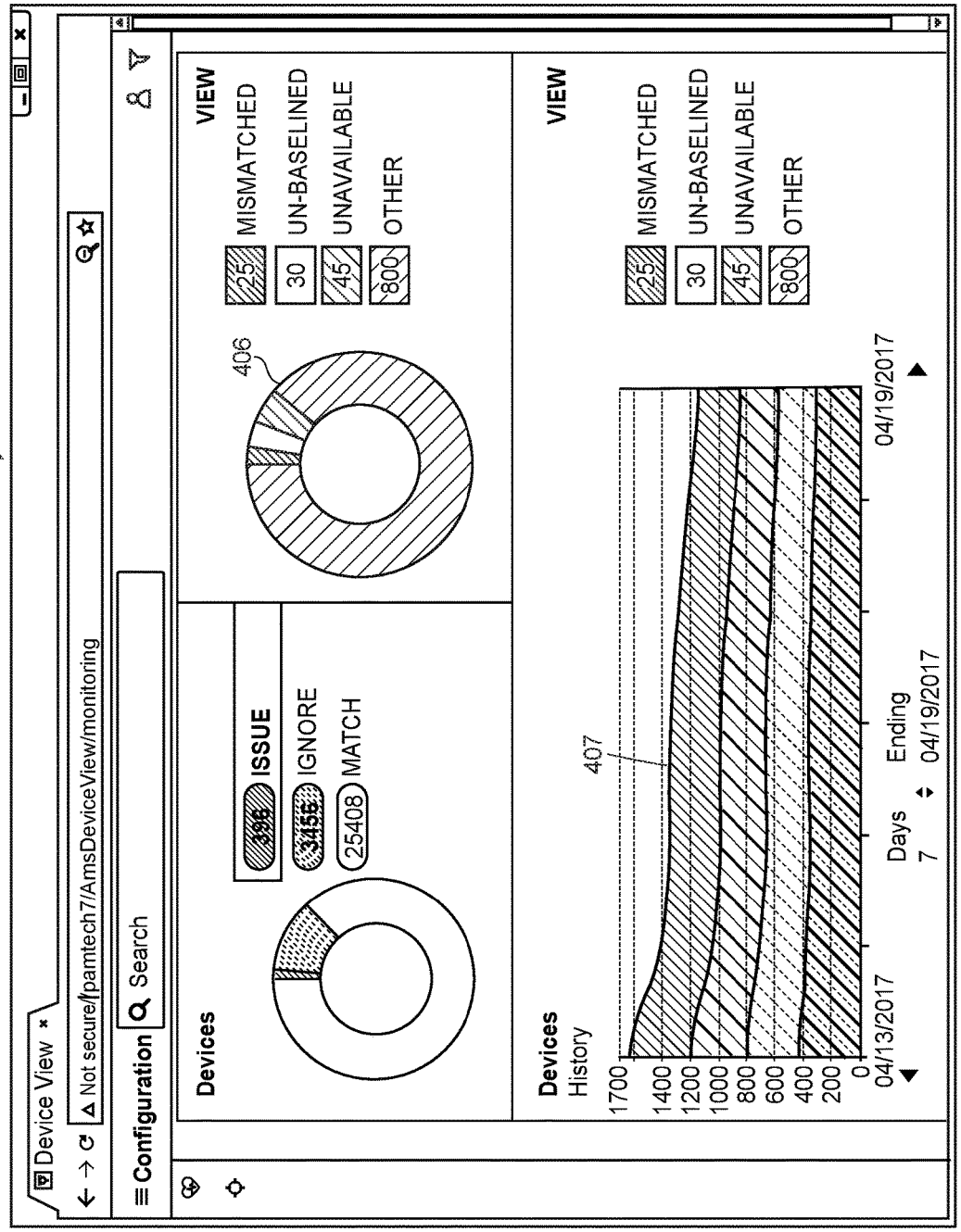

FIG. 4B illustrates an interface 405 that the electronic device may display after detecting a selection of the configuration section 404 of FIG. 4A. The interface 405 includes a set of information and content depicting the configuration of process control devices and how it compares to baseline or defined parameters. For example, the interface 405 may include a chart 406 indicating that twenty-five (25) process control devices are "mismatched" (i.e., have a configuration that does not match the corresponding defined parameters), thirty (30) process control devices are "un-baselined" (i.e., do not have a corresponding defined parameter), forty-five (45) process control devices are "unavailable," and eight hundred (800) process control devices are categorized as "other." The interface 405 may further include a chart 407 that depicts information similar to that of the chart 406, but as a historical line graph. An individual may review the content in the interface 405 to effectively and efficiently assess an amount and percentage of devices having commissioning data that is mismatched from corresponding defined parameters, or otherwise un-baselined or unavailable. Additionally, the interface 405 may include selectable content that may enable the individual to review additional information associated with the depicted information.

Figure 4C:
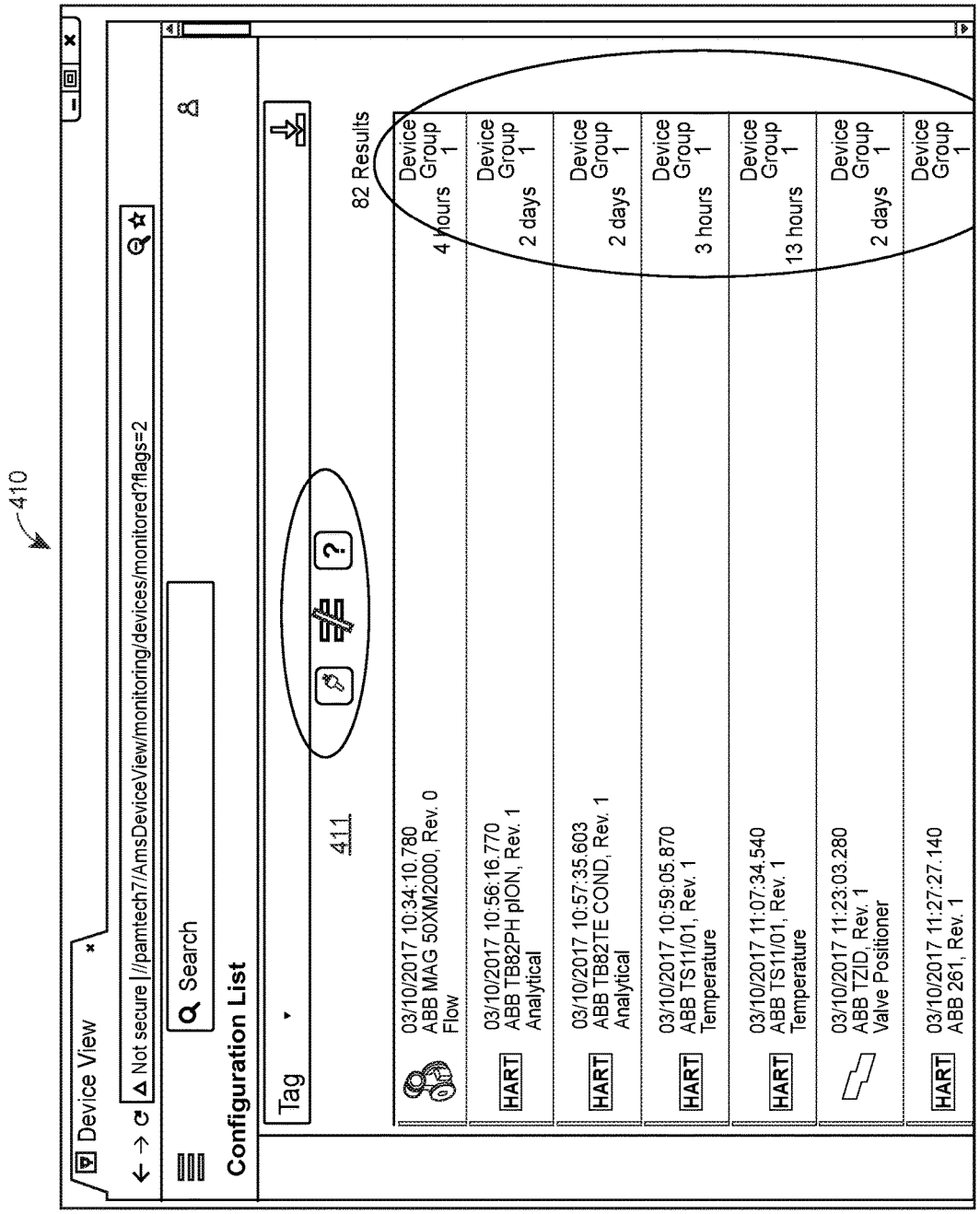

FIG. 4C illustrates an interface 410 including process control device-specific information. In embodiments, the electronic device may display the interface 410 after detecting a selection of the one of the "mismatched" categories as depicted in the interface 405 of FIG. 4B. The interface 410 may include a listing 411 of process control devices and information associated with the mismatch in commissioning status. For example, the listing 411 includes device "ABB MAG 50XM2000" that is included within "Device Group 1" and that has mismatched with its defined parameter for four (4) hours. An individual may review the interface 410 to assess a status of the process control device(s) and determine any remedial measures to undertake to correct discrepancies.

Figure 4D:
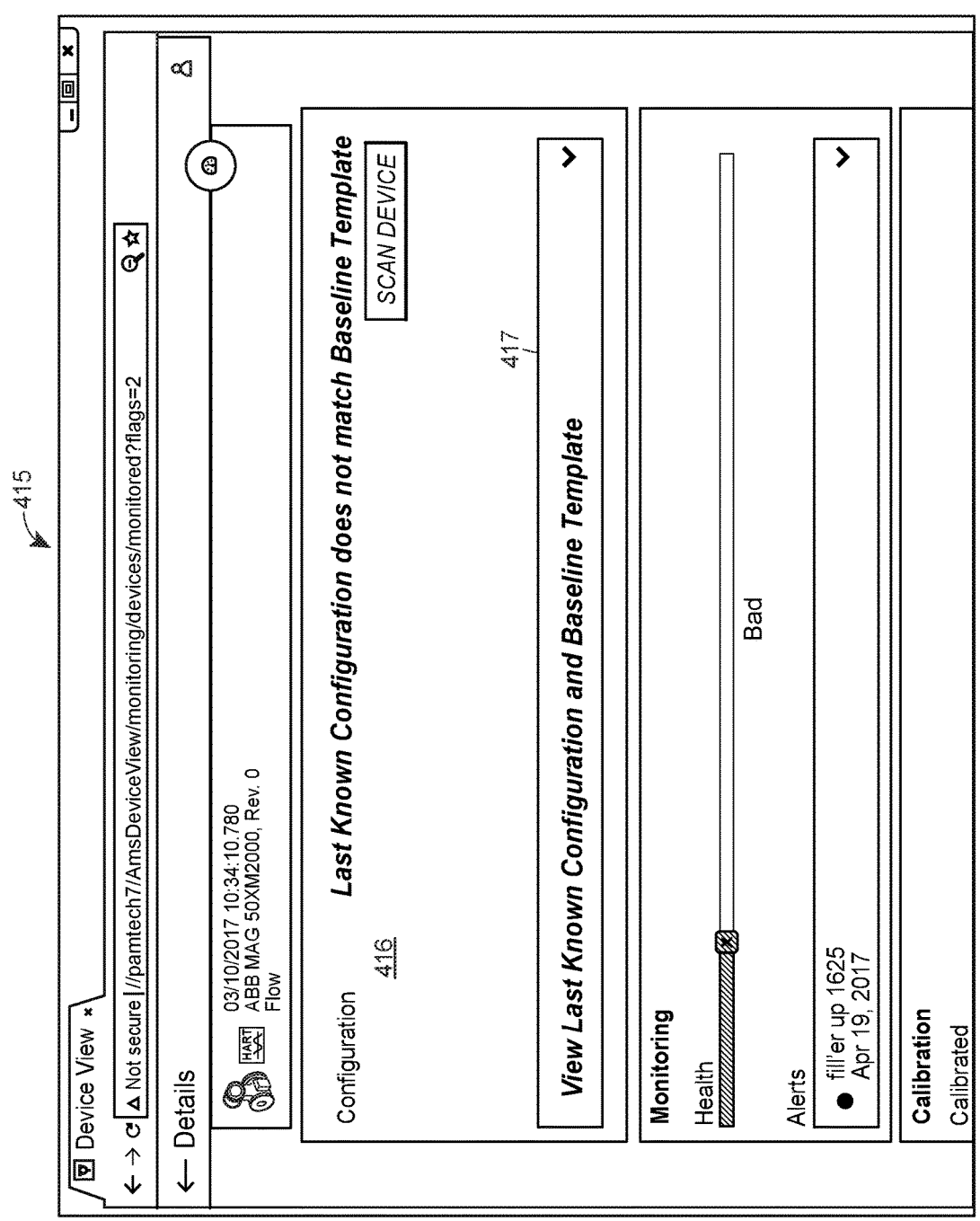

FIG. 4D illustrates an interface 415 that may include information corresponding to a selected process control device, such as one of the process control devices depicted in the interface 410 of FIG. 4C. The interface 415 may include an information section 416 that may indicate commissioning data associated with a selected process control device. In embodiments, the information section 416 may indicate that the commissioning status data of the process control device does not match the defined parameters, and may enable, via a selection 417, the individual to access additional information, such as any or all of the commissioning status data and/or the defined parameters. Accordingly, the individual may review the information section 416 to assess a status of the process control device and determine any remedial measures to undertake to correct discrepancies.

Figure 4E:
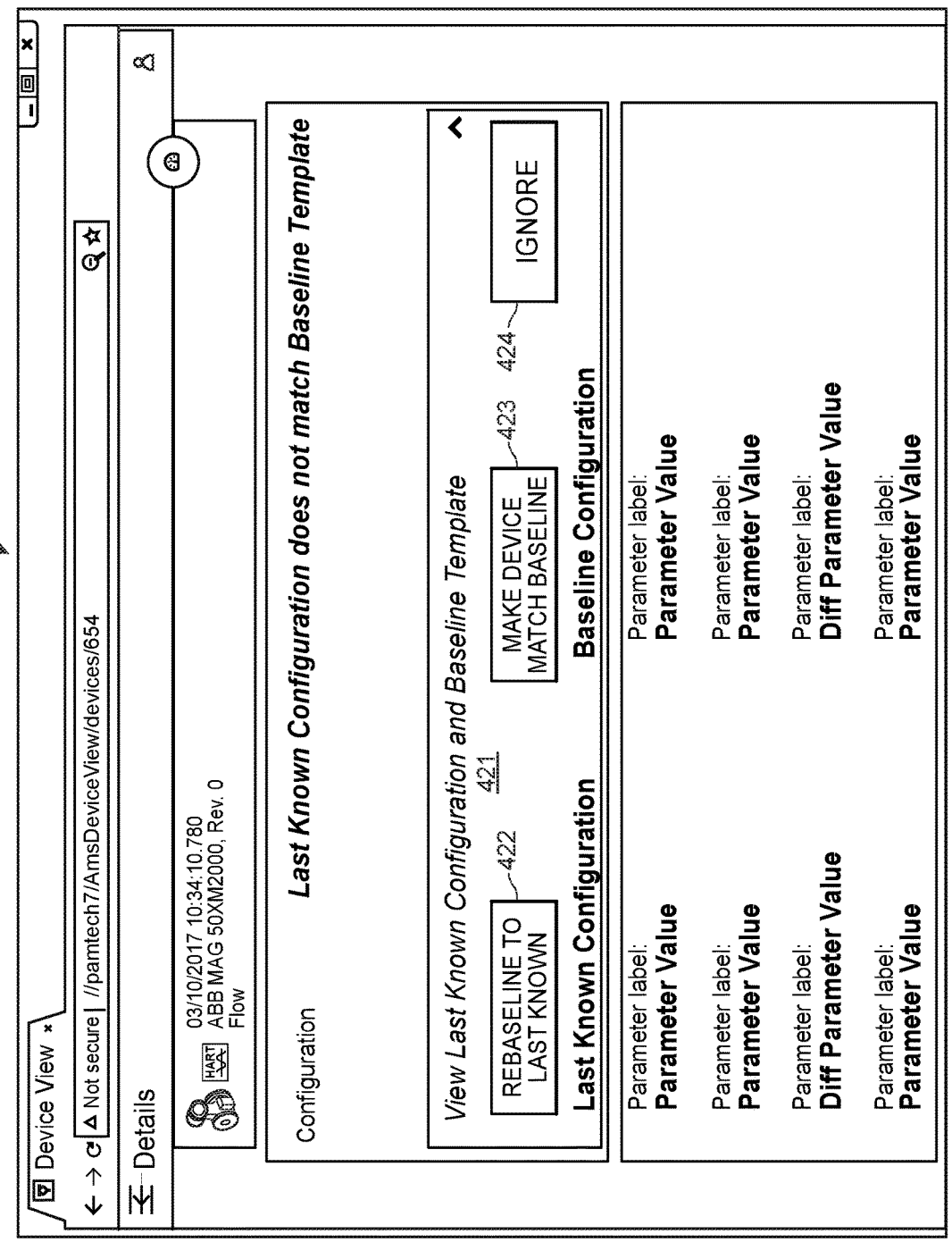

FIG. 4E illustrates an interface 420 that includes information that the electronic device may display after the individual selects the selection 417 of FIG. 4D. The interface 420 may include a section 421 that details the last known configuration for and a baseline configuration assigned to the process control device, thus enabling the individual to assess any differences. The section 421 may include a set of selections that may be selectable by the individual: a re-baseline selection 422 that, when selected, may cause the electronic device to facilitate setting the baseline configuration of the process control device to be the last known configuration of the process control device; a match selection 423 that, when selected, may cause the electronic device to facilitate setting the configuration of the process control device to match the baseline configuration; and an ignore selection 424 that, when selected, may cause the electronic device to dismiss the section 421 and/or display another interface.

Figure 4F:
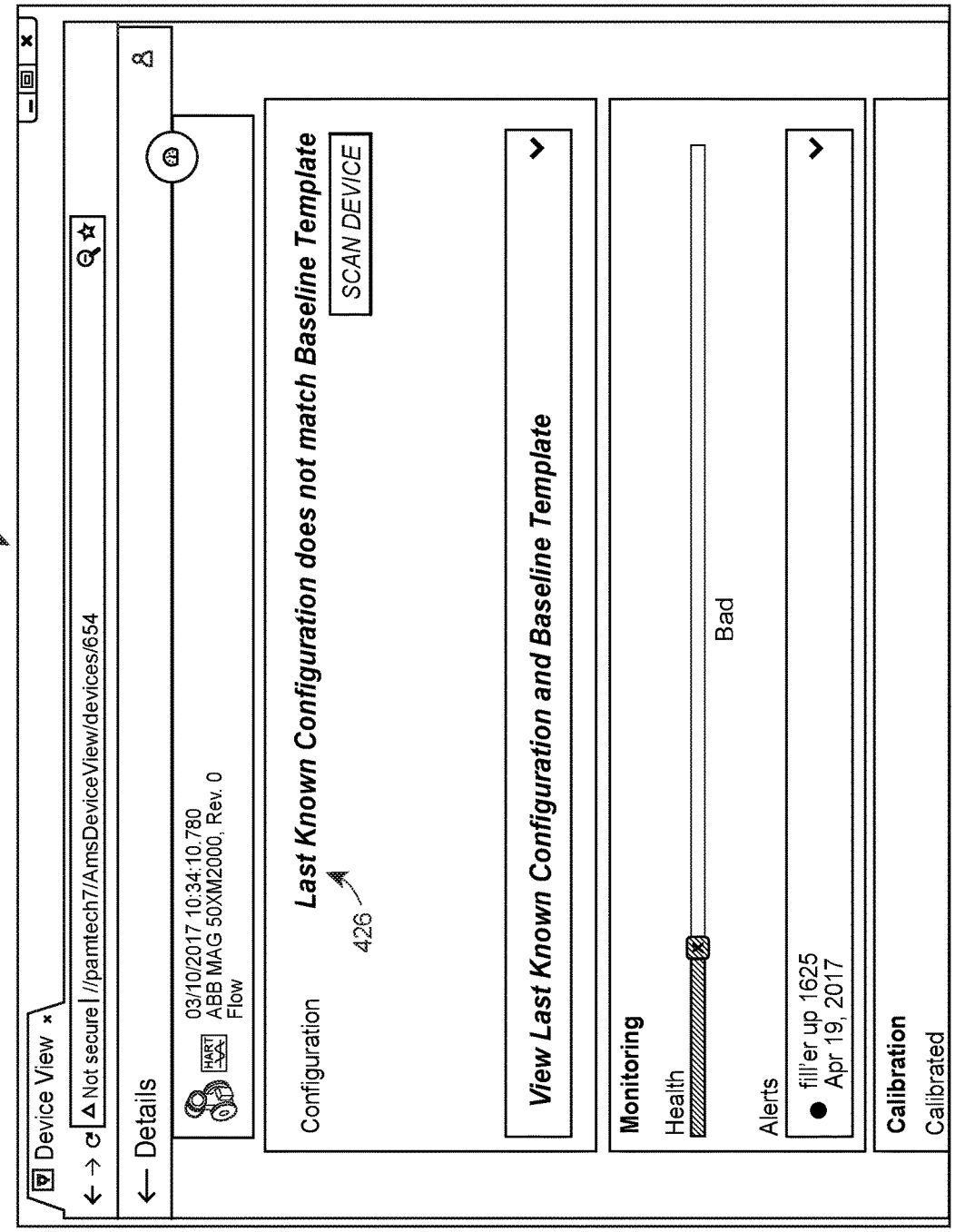

FIG. 4F illustrates an interface 425 that may include information corresponding to a selected process control device. In embodiments, the electronic device may display the interface 425 after the individual selects either the re-baseline selection 422 or the match selection 423 as depicted in FIG. 4E. As depicted in FIG. 4F, the interface 425 indicates (426) that the last known configuration of the process control device matches the baseline template corresponding to the process control device.

Figure 4G:
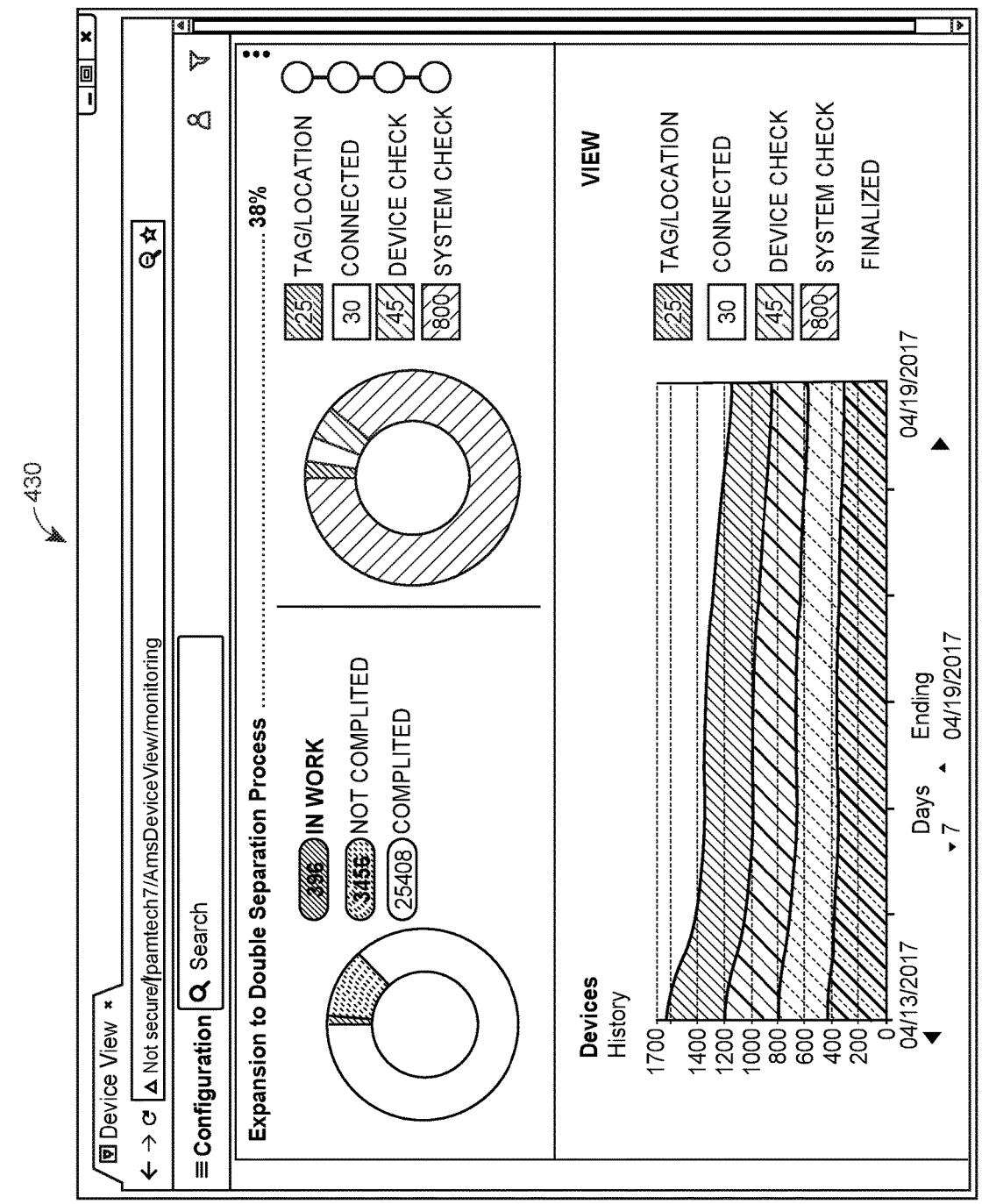

FIG. 4G illustrates an interface 430 that the electronic device may display after detecting a selection of the project section 401 of FIG. 4A. The interface 430 includes a set of information and content depicting the status of a commissioning project within the process plant (as shown: the "Expansion to Double Separation Process" project of the project section 401). For example, the interface 430 may include various charts and graphs that indicate the statuses (e.g., tab/location, connected, device check, system check) of process control devices associated with the commissioning project. An individual may review the content in the interface 430 to effectively and efficiently assess the status of commissioning projects. Additionally, the interface 430 may include selectable content that may enable the individual to review additional information associated with the depicted information.

Figure 4H:
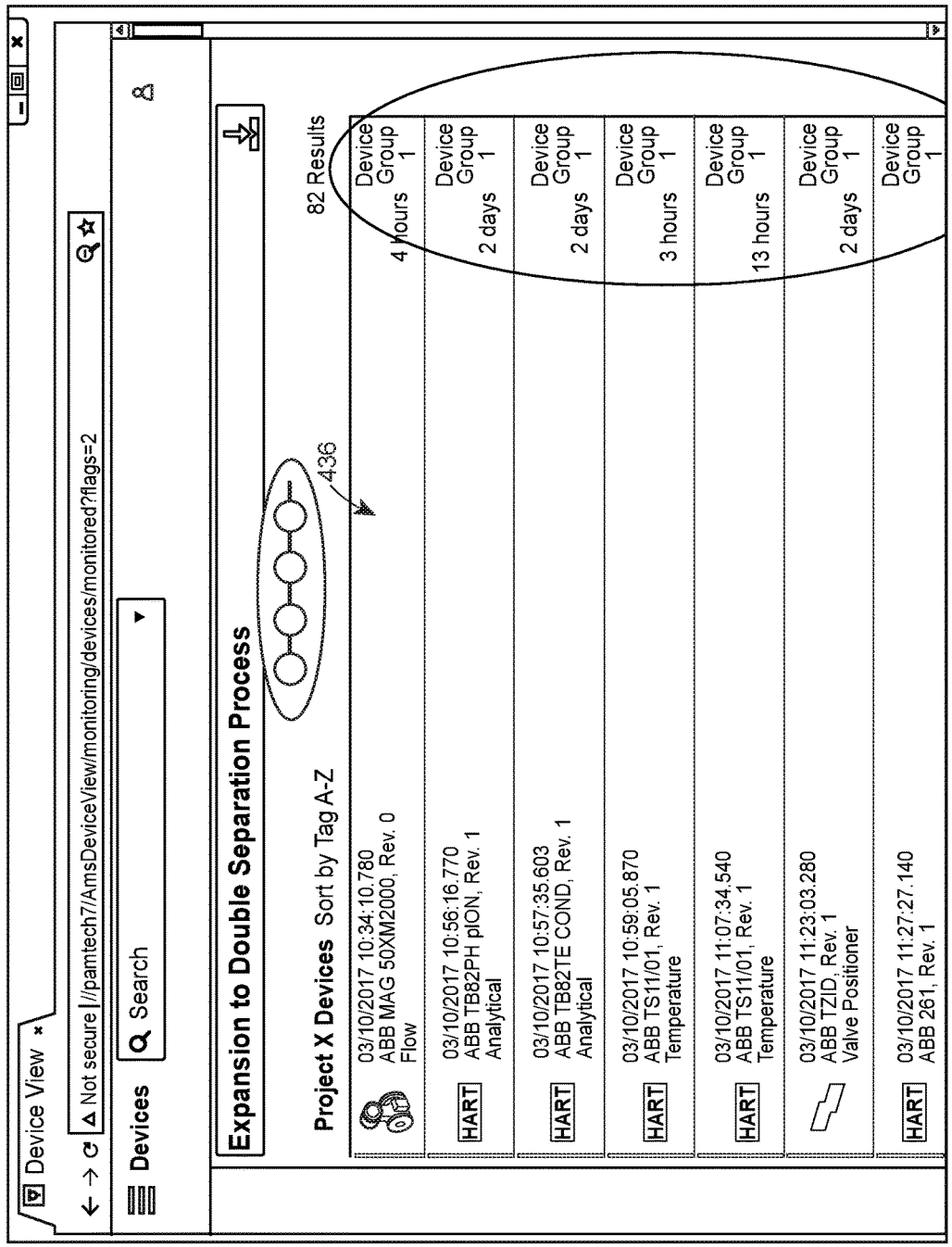

FIG. 4H illustrates an interface 435 including process control device-specific information. In embodiments, the electronic device may display the interface 435 after detecting a selection included in the interface 430 (or another interface). The interface 435 includes a listing 436 of process control devices that are specific to "Project X," and information associated with the process control devices. For example, the listing 436 includes device "ABB MAG 50XM2000" that is included within "Device Group 1." An individual may review the interface 436 to assess a status of the process control device(s) and determine any remedial measures to correct errors.

FIG. 4I illustrates an interface 440 that may include information corresponding to a selected process control device, such as one of the process control devices depicted in the interface 435 of FIG. 4H. The interface 440 may include an information section 441 that may indicate commissioning status information associated with a selected process control device. Accordingly, the individual may review the information section 441 to assess a commissioning status of the process control device and determine any remedial measures to correct errors.

Figure 4J:
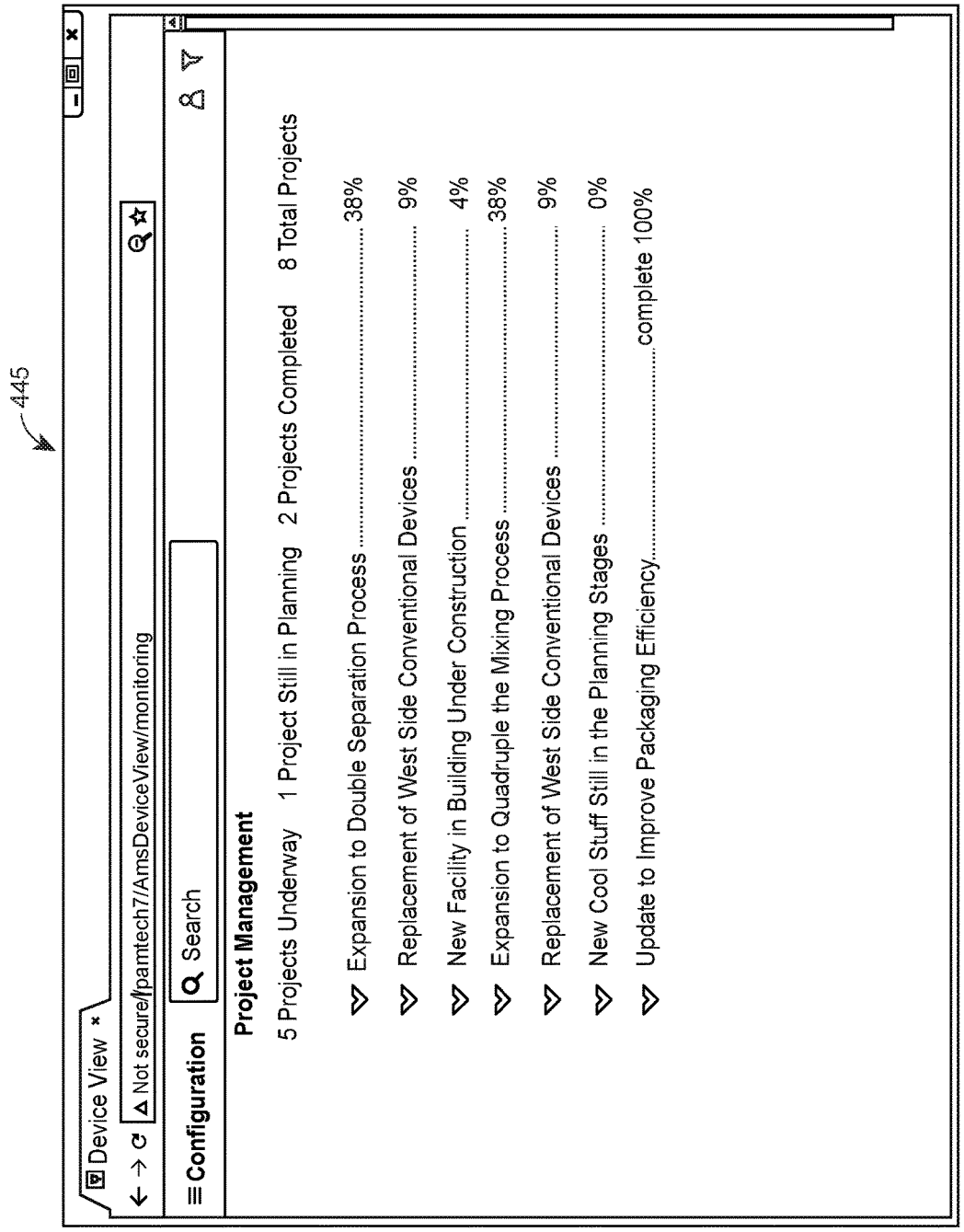

FIG. 4J illustrates an interface 445 that may include a summary of commissioning projects. In particular, the interface 445 may indicate scheduled, in process, and/or completed commissioning projects (such as those included in the project section 401 of FIG. 4A), as well as statuses thereof (e.g., underway, in planning, completed). Accordingly, the individual may review the interface 445 to efficiently and effectively assess the statuses of the commissioning projects.

Figure 5:
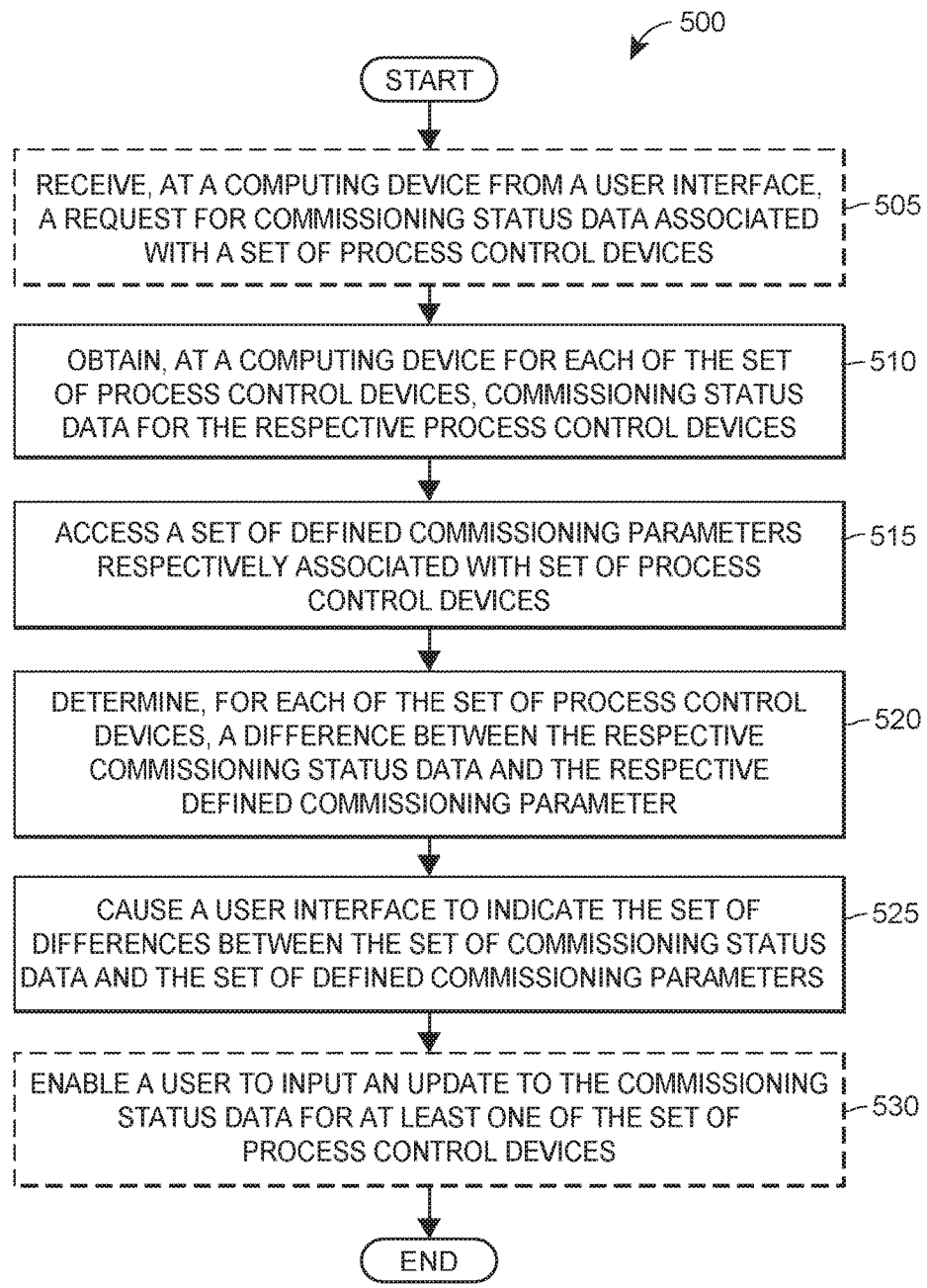
FIG. 5 is a flow diagram of an example method of accessing commissioning data associated with a set of process control devices in a process plant.

FIG. 5 depicts a block diagram of an example method 500 of accessing commissioning data associated with a set of process control devices, or simply devices, in a process plant. According to embodiments, at least some of the set of process control devices are communicatively connected to operate in the process plant during run-time to control a set of processes. The method 500 may be facilitated by a computing device having a processor or controller (such as the processor 314 as discussed with respect to FIG. 3) that may communicate with one or more process control devices, memories, user interfaces, and electronic devices.

The method 500 may begin when the computing device optionally receives (block 505), from a user interface, a request for commissioning status data associated with a set of process control devices. In embodiments, the user interface may be incorporated as part of the computing device or another electronic device associated with the process plant.

The computing device may obtain (block 510), for each of the set of process control devices, commissioning status data for the respective process control device. In embodiments, the computing device may obtain the commissioning status data in response to receiving the request in block 505, or may obtain the commissioning status data automatically or in response to another trigger. To obtain the commissioning status data, the computing device may retrieve the commissioning status data directly (or indirectly) from each of the set of process control devices.

The computing device may access (block 515) a set of defined commissioning parameters respectively associated with the set of process control devices. In embodiments, the set of defined commissioning parameters may be stored in memory, and may be default parameters and/or modifiable by individuals associated with the process plant. Generally, the commissioning status data may include a current configuration of the respective process control device and the defined commissioning parameter may include a desired configuration for the respective process control device.

The computing device may determine (block 520), for each of the set of process control devices, a difference between the respective commissioning status data and the respective defined commissioning parameter. In embodiments, the computing device may determine, for each of the set of process control devices, a difference between the respective current configuration and the respective desired configuration. Additionally or alternatively, the computing device may determine that a portion of the set of process control devices conforms with a respective portion of the set of defined commissioning parameters, and a remaining portion of the set of process control devices does not conform with a respective remaining portion of the set of defined commissioning parameters.

The computing device may cause (block 525) a user interface to indicate the set of differences between the set of commissioning status data and the set of defined commissioning parameters. In embodiments, the user interface may be incorporated as part of the computing device or another electronic device associated with the process plant. In causing the user interface to indicate the set of differences, the computing device may cause the user interface to indicate the portion of the set of process control devices that conforms with the respective portion of the set of defined commissioning parameters, and the remaining portion of the set of process control devices that does not conform with the respective remaining portion of the set of defined commissioning parameters. In an implementation, the computing device may receive, via the user interface, a selection of one of the set of process control devices, and may accordingly cause the user interface to indicate the difference associated with the one of the set of process control devices in a visually distinctive manner (e.g., highlighting).

The computing device may optionally enable (block 530) a user to input an update to the commissioning status data for at least one of the set of process control devices. In embodiments, the user may input the update via the user interface. Accordingly, the computing device may cause the update to the commissioning status data to be stored for subsequent access.

Figure 6:
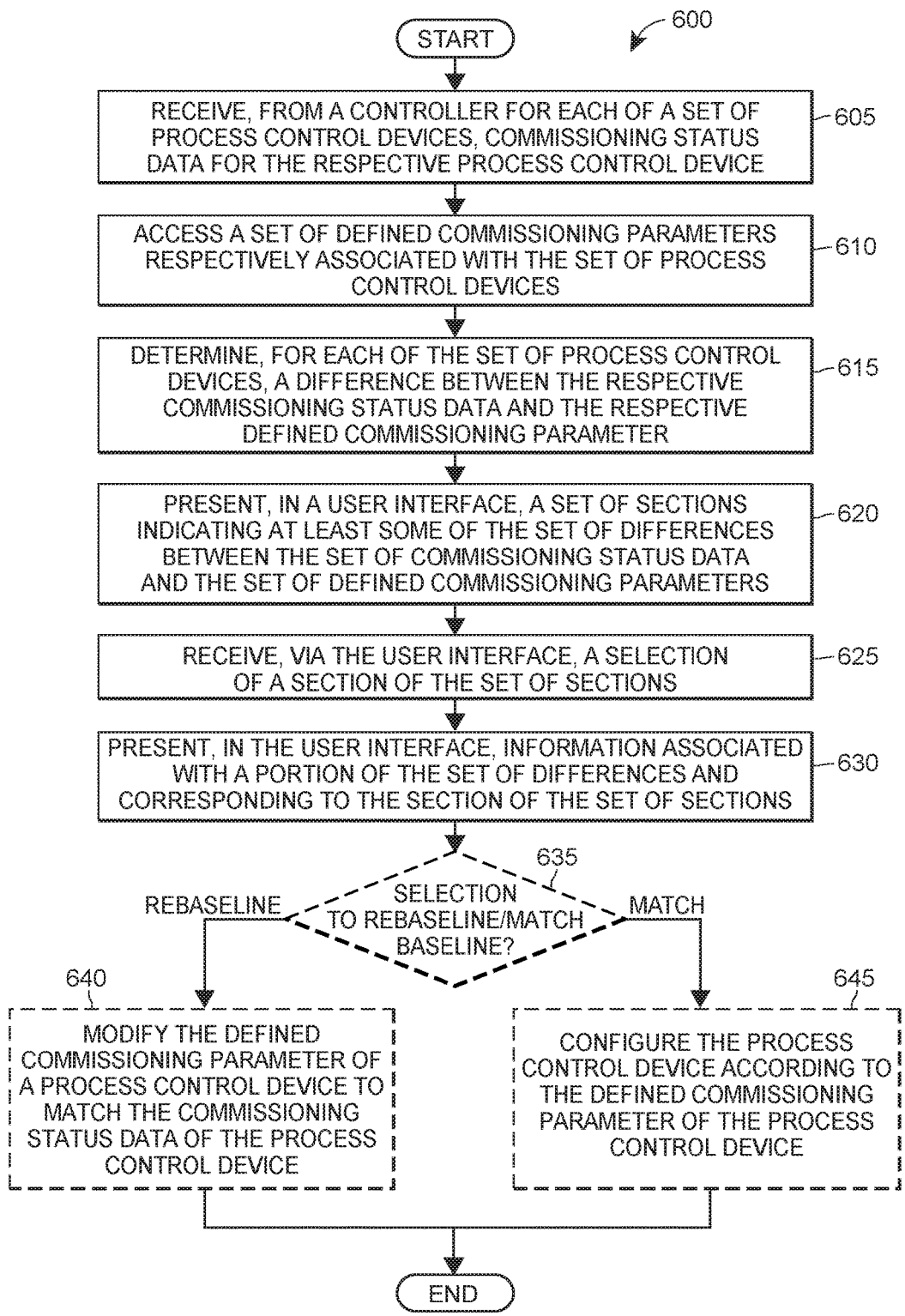
FIG. 6 is a flow diagram of an example method of presenting commissioning data associated with a set of process control devices in a process plant.

FIG. 6 depicts a block diagram of an example method 600 of presenting commissioning data associated with a set of process control devices, or simply devices, in a process plant. According to embodiments, at least some of the set of process control devices are communicatively connected to operate in the process plant during run-time to control a set of processes. The method 600 may be facilitated by an electronic device having an user interface or otherwise configured to communicate with a user interface, where the electronic device may communicate with one or more process control devices, memories, and other computing devices.

The method 600 may begin when the electronic device receives (block 605), from a controller for each of a set of process control devices, commissioning status data for the respective process control device. In embodiments, the electronic device may receive the commissioning status data automatically or in response to a trigger. The electronic device may access (block 610) a set of defined commissioning parameters respectively associated with the set of process control devices. In embodiments, the set of defined commissioning parameters may be stored in memory, and may be default parameters and/or modifiable by individuals associated with the process plant. Generally, the commissioning status data may include a current configuration of the respective process control device and the defined commissioning parameter may include a desired configuration for the respective process control device.

The electronic device may determine (block 615), for each of the set of process control devices, a difference between the respective commissioning status data and the respective defined commissioning parameter. In embodiments, the electronic device may determine, for each of the set of process control devices, a difference between the respective current configuration and the respective desired configuration. Additionally or alternatively, the electronic device may determine that a portion of the set of process control devices conforms with a respective portion of the set of defined commissioning parameters, and a remaining portion of the set of process control devices does not conform with a respective remaining portion of the set of defined commissioning parameters.

The electronic device may present (block 620), in a user interface, a set of sections indicating at least some of the set of differences between the set of commissioning status data and the set of defined commissioning parameters. In embodiments, the electronic device may present at least one of: a project section, a monitoring section, a calibration section, and a configuration section.

The electronic device may receive (block 625), via the user interface, a selection of a section of the set of sections. In response to receiving the selection, the electronic device may present (block 630), in the user interface, information associated with a portion of the set of differences and corresponding to the section of the set of sections. In embodiments, the electronic device may present at least one graph indicating the information associated with the portion of the set of differences, where the at least one graph may indicate a historical progression of the portion of the set of differences. Additionally or alternatively, the electronic device may present a listing of a portion of the set of process control devices having commissioning status data that differs from the defined commissioning parameters.

The electronic device may optionally present, in the user interface, an option to rebaseline a process control device of the set of process control devices, and an option to match baseline of the process control device, and may detect (block 635) whether a corresponding selection is received. If a selection of the option to rebaseline the process control device is received ("REBASELINE"), the electronic device may modify (block 640), or cause to modify, the defined commissioning parameter of the process control device to match the commissioning status data of the process control device (e.g., update the defined commissioning parameter stored in memory). If a selection of the option to match baseline of the process control device is received ("MATCH"), the electronic device may configure (block 645), or cause to configure, the process control device according to the defined commissioning parameter of the process control device. In particular, the electronic device may cause appropriate configuration data to be provided to the process control device for implementation thereon.

Embodiments of the techniques described in the present disclosure may include any number of the following aspects, either alone or combination:

1. A computer-implemented method of accessing commissioning data associated with a set of devices in a process plant, where at least some of the set of devices are communicatively connected to operate in the process plant during run-time to control a set of processes, the method comprising: obtaining, at a computing device for each of the set of devices, commissioning status data for the respective device; accessing a set of defined commissioning parameters respectively associated with the set of devices; determining, by the computing device for each of the set of devices, a difference between the respective commissioning status data and the respective defined commissioning parameter; and causing a user interface to indicate the set of differences between the set of commissioning status data and the set of defined commissioning parameters.

2. The computer-implemented method of claim 1, wherein the commissioning status data comprises a current configuration of the respective device and the defined commissioning parameter comprises a desired configuration for the respective device, and wherein determining the difference comprises: determining, for each of the set of devices, the difference between the respective current configuration and the respective desired configuration.

3. The computer-implemented method of claim 1, wherein determining, for each of the set of devices, the difference between the respective commissioning status data and the respective defined commissioning parameter comprises: determining that (i) a portion of the set of devices conforms with a respective portion of the set of defined commissioning parameters, and (ii) a remaining portion of the set of devices does not conform with a respective remaining portion of the set of defined commissioning parameters.

4. The computer-implemented method of claim 3, wherein causing the user interface to indicate the set of differences comprises: causing the user interface to indicate (i) the portion of the set of devices that conforms with the respective portion of the set of defined commissioning parameters, and (ii) the remaining portion of the set of devices that does not conform with the respective remaining portion of the set of defined commissioning parameters.

5. The computer-implemented method of any of claims 1 to 4, further comprising: enabling a user to input an update to the commissioning status data for at least one of the set of devices.

6. The computer-implemented method of claim 5, wherein enabling the user to input the update to the commissioning status data comprises: enabling the user to input, via the user interface, the update to the commissioning status data.

7. The computer-implemented method of any of claims 1 to 6, further comprising: receiving, via the user interface, a selection of one of the set of devices; and causing the user interface to indicate the difference associated with the one of the set of devices in a visually distinctive manner.

8. The computer-implemented method of any of claims 1 to 7, wherein obtaining, at the computing device for each of the set of devices, the commissioning status data for the respective device comprises: receiving, from the user interface, a request for the commissioning status data; and responsive to receiving the request, retrieving, for each of the set of devices, the commissioning status data for the respective device.

9. A system in a process plant for accessing commissioning data associated with the process plant, comprising: a set of devices communicatively connected to operate in the process plant during run-time to control a set of processes; a user interface for presenting content; a memory storing a set of defined commissioning parameters respectively associated with the set of devices; a communication unit; and a processor interfacing with the set of devices, the user interface, the memory, and the communication unit, and configured to: receive, via the communication unit from each of the set of devices, commissioning status data for the respective device, access, from the memory, the set of defined commissioning parameters respectively associated with the set of devices, determine, for each of the set of devices, a difference between the respective commissioning status data and the respective defined commissioning parameter, and cause the user interface to indicate the set of differences between the set of commissioning status data and the set of defined commissioning parameters.

10. The system of claim 9, wherein the commissioning status data comprises a current configuration of the respective device and the defined commissioning parameter comprises a desired configuration for the respective device, and wherein to determine the difference, the processor is configured to: determine, for each of the set of devices, the difference between the respective current configuration and the respective desired configuration.

11. The system of claim 9, wherein to determine, for each of the set of devices, the difference between the respective commissioning status data and the respective defined commissioning parameter, the processor is configured to: determine that (i) a portion of the set of devices conforms with a respective portion of the set of defined commissioning parameters, and (ii) a remaining portion of the set of devices does not conform with a respective remaining portion of the set of defined commissioning parameters.

12. The system of claim 11, wherein the user interface indicates (i) the portion of the set of devices that conforms with the respective portion of the set of defined commissioning parameters, and (ii) the remaining portion of the set of devices that does not conform with the respective remaining portion of the set of defined commissioning parameters.

13. The system of any of claims 9 to 12, wherein the processor interfaces with the user interface via a wireless network connection.

14. The system of any of claims 9 to 13, wherein the processor is further configured to: enable a user to input, via the user interface, an update to the commissioning status data for at least one of the set of devices.

15. The system of any of claims 9 to 14, wherein the user interface is configured to: receive a selection of one of the set of devices, and indicate the difference associated with the one of the set of devices in a visually distinctive manner.

16. An electronic device for managing commissioning data associated with a process plant, comprising: a user interface for presenting content; a transceiver interfacing with a computing device communicatively connected to a set of devices communicatively connected to operate in the process plant during run-time to control a set of processes; a memory storing a set of computer-executable instructions; and a processor interfacing with the user interface, the transceiver, and the memory, and configured to execute the set of computer-executable instructions to cause the processor to: receive, via the user interface, a selection of at least one of the set of devices, retrieve, via the transceiver from the one of the set of devices, commissioning status data for the at least one of the set of devices, the commissioning status data indicating a current configuration of the at least one of the set of devices, access a defined commissioning parameter associated with the at least one of the set of devices, determine a difference between the commissioning status data and the defined commissioning parameter, and cause the user interface to indicate the difference between the commissioning status data and the defined commissioning parameter.

17. The electronic device of claim 16, wherein the processor is configured to execute the set of computer-executable instructions to further cause the processor to: cause the user interface to present (i) an option to rebaseline a device of the set of devices, and (ii) an option to match baseline of the device.

18. The electronic device of claim 17, wherein the processor is configured to execute the set of computer-executable instructions to further cause the processor to: receive, via the user interface, a selection of the option to rebaseline the device, and cause the defined commissioning parameter of the device to be modified to match the commissioning status data of the device.

19. The electronic device of claim 17, wherein the processor is configured to execute the set of computer-executable instructions to further cause the processor to: receive, via the user interface, a selection of the option to match baseline of the device, and cause the device to be configured according to the defined commissioning parameter of the device.

20. The electronic device of any of claims 16 to 19, wherein the commissioning status data comprises a current configuration of the respective device and the defined commissioning parameter comprises a desired configuration for the respective device, and wherein to determine the difference, the processor is configured to: determine, for each of the at least one of the set of devices, the difference between the respective current configuration and the respective desired configuration.

21. The electronic device of any of claims 16 to 20, wherein the processor is configured to execute the set of computer-executable instructions to further cause the processor to: enable a user to input, via the user interface, an update to the commissioning status data for the at least one of the set of devices.

22. The electronic device of any of claims 16 to 21, wherein the processor is configured to execute the set of computer-executable instructions to further cause the processor to: in response to receiving the selection of the at least one of the set of devices, cause the user interface to indicate the difference associated with the at least one of the set of devices in a visually distinctive manner.

23. A computer-implemented method in an electronic device of presenting commissioning data associated with a set of devices in a process plant, where at least some of the set of devices are communicatively connected to operate in the process plant during run-time to control a set of processes, the method comprising: receiving, from a controller for each of the set of devices, commissioning status data for the respective device; accessing a set of defined commissioning parameters respectively associated with the set of devices; determining, by a processor for each of the set of devices, a difference between the respective commissioning status data and the respective defined commissioning parameter; presenting, in a user interface, a set of sections indicating at least some of the set of differences between the set of commissioning status data and the set of defined commissioning parameters; receiving, via the user interface, a selection of a section of the set of sections; and presenting, in the user interface, information associated with a portion of the set of differences and corresponding to the section of the set of sections.

24. The computer-implemented method of claim 23, wherein presenting, in the user interface, the set of sections indicating the at least some of the set of differences comprises: presenting, in the user interface, at least one of: a project section, a monitoring section, a calibration section, and a configuration section.

25. The computer-implemented method of either of claim 23 or 24, wherein presenting, in the user interface, the information associated with the portion of the set of differences comprises: presenting, in the user interface, at least one graph indicating the information associated with the portion of the set of differences.

26. The computer-implemented method of claim 25, wherein presenting, in the user interface, the at least one graph comprises: presenting, in the user interface, the at least one graph indicating a historical progression of the portion of the set of differences.

27. The computer-implemented method of either of claim 23 or 24, wherein presenting, in the user interface, the information associated with the portion of the set of differences comprises: presenting, in the user interface, a listing of a portion of the set of devices having commissioning status data that differs from the defined commissioning parameters.

28. The computer-implemented method of any of claims 23 to 27, further comprising: presenting, in the user interface, (i) an option to rebaseline a device of the set of devices, and (ii) an option to match baseline of the device.

29. The computer-implemented method of claim 28, further comprising: receiving, via the user interface, a selection of the option to rebaseline the device; and causing the defined commissioning parameter of the device to be modified to match the commissioning status data of the device.

30. The computer-implemented method of claim 28, further comprising: receiving, via the user interface, a selection of the option to match baseline of the device; and causing the device to be configured according to the defined commissioning parameter of the device.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a commissioning tool, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "administrator," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A computer-implemented method of accessing commissioning data associated with a set of devices in a process plant, where at least some of the set of devices are communicatively connected to operate in the process plant during run-time to control a set of processes, the method comprising:
   obtaining, at a computing device for each of the set of devices, commissioning status data for the respective device;
   accessing a set of defined commissioning parameters respectively associated with the set of devices;
   determining, by the computing device for each of the set of devices, a difference between the respective commissioning status data and the respective defined commissioning parameter; and
   causing a user interface to indicate (i) the set of differences between the set of commissioning status data and the set of defined commissioning parameters, (ii) a first option to modify, for a device of the set of devices, the defined commissioning parameter of the device to match the commissioning status data of the device, and (iii) a second option to configure the device according to the defined commissioning parameter of the device.

2. The computer-implemented method of claim 1, wherein the commissioning status data comprises a current configuration of the respective device and the defined commissioning parameter comprises a desired configuration for the respective device, and wherein determining the difference comprises:
   determining, for each of the set of devices, the difference between the respective current configuration and the respective desired configuration.

3. The computer-implemented method of claim 1, wherein determining, for each of the set of devices, the difference between the respective commissioning status data and the respective defined commissioning parameter comprises:
   determining that (i) a portion of the set of devices conforms with a respective portion of the set of defined commissioning parameters, and (ii) a remaining portion of the set of devices does not conform with a respective remaining portion of the set of defined commissioning parameters.

4. The computer-implemented method of claim 3, wherein causing the user interface to indicate the set of differences comprises:
   causing the user interface to indicate (i) the portion of the set of devices that conforms with the respective portion of the set of defined commissioning parameters, and (ii) the remaining portion of the set of devices that does not conform with the respective remaining portion of the set of defined commissioning parameters.

5. The computer-implemented method of claim 1, further comprising:
   enabling a user to input an update to the commissioning status data for at least one of the set of devices.

6. The computer-implemented method of claim 5, wherein enabling the user to input the update to the commissioning status data comprises:
   enabling the user to input, via the user interface, the update to the commissioning status data.

7. The computer-implemented method of claim 1, further comprising:
   receiving, via the user interface, a selection of one of the set of devices; and
   causing the user interface to indicate the difference associated with the one of the set of devices in a visually distinctive manner.

8. The computer-implemented method of claim 1, wherein obtaining, at the computing device for each of the set of devices, the commissioning status data for the respective device comprises:
   receiving, from the user interface, a request for the commissioning status data; and
   responsive to receiving the request, retrieving, for each of the set of devices, the commissioning status data for the respective device.

9. A system in a process plant for accessing commissioning data associated with the process plant, comprising:
   a set of devices communicatively connected to operate in the process plant during run-time to control a set of processes;
   a user interface for presenting content;
   a memory storing a set of defined commissioning parameters respectively associated with the set of devices;
   a communication unit; and
   a processor interfacing with the set of devices, the user interface, the memory, and the communication unit, and configured to:
      receive, via the communication unit from each of the set of devices, commissioning status data for the respective device,
      access, from the memory, the set of defined commissioning parameters respectively associated with the set of devices,
      determine, for each of the set of devices, a difference between the respective commissioning status data and the respective defined commissioning parameter, and
      cause the user interface to indicate (i) the set of differences between the set of commissioning status data and the set of defined commissioning parameters, (ii) a first option to modify, for a device of the set of devices, the defined commissioning parameter of the device to match the commissioning status data of the device, and (iii) a second option to configure the device according to the defined commissioning parameter of the device.

10. The system of claim 9, wherein the commissioning status data comprises a current configuration of the respective device and the defined commissioning parameter comprises a desired configuration for the respective device, and wherein to determine the difference, the processor is configured to:
   determine, for each of the set of devices, the difference between the respective current configuration and the respective desired configuration.

11. The system of claim 9, wherein to determine, for each of the set of devices, the difference between the respective commissioning status data and the respective defined commissioning parameter, the processor is configured to:
   determine that (i) a portion of the set of devices conforms with a respective portion of the set of defined commissioning parameters, and (ii) a remaining portion of the set of devices does not conform with a respective remaining portion of the set of defined commissioning parameters.

12. The system of claim 11, wherein the user interface indicates (i) the portion of the set of devices that conforms with the respective portion of the set of defined commissioning parameters, and (ii) the remaining portion of the set of devices that does not conform with the respective remaining portion of the set of defined commissioning parameters.

13. The system of claim 9, wherein the processor interfaces with the user interface via a wireless network connection.

14. The system of claim 9, wherein the processor is further configured to:
   enable a user to input, via the user interface, an update to the commissioning status data for at least one of the set of devices.

15. The system of claim 9, wherein the user interface is configured to:
   receive a selection of one of the set of devices, and
   indicate the difference associated with the one of the set of devices in a visually distinctive manner.

16. An electronic device for managing commissioning data associated with a process plant, comprising:
   a user interface for presenting content;
   a transceiver interfacing with a computing device communicatively connected to a set of devices communicatively connected to operate in the process plant during run-time to control a set of processes;

a memory storing a set of computer-executable instructions; and a processor interfacing with the user interface, the transceiver, and the memory, and configured to execute the set of computer-executable instructions to cause the processor to:

receive, via the user interface, a selection of a device of the set of devices, retrieve, via the transceiver from the device, commissioning status data for the device, the commissioning status data indicating a current configuration of the device, access a defined commissioning parameter associated with the at device, determine a difference between the commissioning status data and the defined commissioning parameter, and cause the user interface to indicate (i) the difference between the commissioning status data and the defined commissioning parameter, (ii) a first option to modify, for the device, the defined commissioning parameter to match the commissioning status data, and (iii) a second option to configure the device according to the defined commissioning parameter.

17. The electronic device of claim 16, wherein the processor is configured to execute the set of computer-executable instructions to further cause the processor to:

receive, via the user interface, a selection of the first option, and cause the defined commissioning parameter of the device to be modified to match the commissioning status data of the device.

18. The electronic device of claim 16, wherein the processor is configured to execute the set of computer-executable instructions to further cause the processor to:

receive, via the user interface, a selection of the second option, and cause the device to be configured according to the defined commissioning parameter of the device.

19. The electronic device of claim 16, wherein the commissioning status data comprises a current configuration of the device and the defined commissioning parameter comprises a desired configuration for the device, and wherein to determine the difference, the processor is configured to:

determine the difference between the respective current configuration and the desired configuration.

20. The electronic device of claim 16, wherein the processor is configured to execute the set of computer-executable instructions to further cause the processor to:

enable a user to input, via the user interface, an update to the commissioning status data for the device.

21. The electronic device of claim 16, wherein the processor is configured to execute the set of computer-executable instructions to further cause the processor to:

in response to receiving the selection of the device, cause the user interface to indicate the difference associated with the device in a visually distinctive manner.

22. A computer-implemented method in an electronic device of presenting commissioning data associated with a set of devices in a process plant, where at least some of the set of devices are communicatively connected to operate in the process plant during run-time to control a set of processes, the method comprising:

receiving, from a controller for each of the set of devices, commissioning status data for the respective device;

accessing a set of defined commissioning parameters respectively associated with the set of devices;

determining, by a processor for each of the set of devices, a difference between the respective commissioning status data and the respective defined commissioning parameter;

presenting, in a user interface, (i) a set of sections indicating at least some of the set of differences between the set of commissioning status data and the set of defined commissioning parameters, (ii) a first option to modify, for a device of the set of devices, the defined commissioning parameter of the device to match the commissioning status data of the device, and (iii) a second option to configure the device according to the defined commissioning parameter of the device;

receiving, via the user interface, a selection of a section of the set of sections; and presenting, in the user interface, information associated with a portion of the set of differences and corresponding to the section of the set of sections.

23. The computer-implemented method of claim 22, wherein presenting, in the user interface, the set of sections indicating the at least some of the set of differences comprises:

presenting, in the user interface, at least one of: a project section, a monitoring section, a calibration section, and a configuration section.

24. The computer-implemented method of claim 22, wherein presenting, in the user interface, the information associated with the portion of the set of differences comprises:

presenting, in the user interface, at least one graph indicating the information associated with the portion of the set of differences.

25. The computer-implemented method of claim 24, wherein presenting, in the user interface, the at least one graph comprises:

presenting, in the user interface, the at least one graph indicating a historical progression of the portion of the set of differences.

26. The computer-implemented method of claim 22, wherein presenting, in the user interface, the information associated with the portion of the set of differences comprises:

presenting, in the user interface, a listing of a portion of the set of devices having commissioning status data that differs from the defined commissioning parameters.

27. The computer-implemented method of claim 22, further comprising:

receiving, via the user interface, a selection of the first option; and causing the defined commissioning parameter of the device to be modified to match the commissioning status data of the device.

28. The computer-implemented method of claim 22, further comprising:

receiving, via the user interface, a selection of the second option; and causing the device to be configured according to the defined commissioning parameter of the device.

* * * * *